United States Patent [19]
Aochi et al.

[11] Patent Number: 5,330,599
[45] Date of Patent: Jul. 19, 1994

[54] GRID STRUCTURES

[75] Inventors: Tak Aochi, Morgan Hill; Robert J. Pyle, Campbell, both of Calif.

[73] Assignee: Lockheed Missiles & Space Company, Inc., Sunnyvale, Calif.

[21] Appl. No.: 286,120

[22] Filed: Dec. 19, 1988

[51] Int. Cl.⁵ .................................. B31C 3/00
[52] U.S. Cl. .................................. 156/173; 156/175; 156/245; 156/441
[58] Field of Search .............. 264/103, 258, 261, 263, 264/271.1, 273, 275, 277, 278, 279, 279.1; 428/105, 113, 114; 156/166, 169, 173, 175, 182, 245, 303.1, 433, 441; 52/309.13, 309.16; 244/159

[56] References Cited

U.S. PATENT DOCUMENTS

| 2,602,766 | 7/1952 | Francis | 156/296 |
| 2,951,781 | 9/1960 | Toegel | 156/182 |
| 3,214,321 | 10/1965 | Graham | 264/258 |
| 3,425,884 | 2/1969 | Brinkema | 156/433 |
| 4,028,460 | 6/1977 | Meyer | 264/279.1 |
| 4,137,354 | 1/1979 | Mayes et al. | 156/175 |
| 4,596,621 | 6/1986 | Nawaz | 156/245 |

FOREIGN PATENT DOCUMENTS

| 1388649 | 3/1975 | United Kingdom | 156/433 |
| 1581532 | 12/1980 | United Kingdom | 156/166 |

Primary Examiner—Peter A. Nelson
Attorney, Agent, or Firm—John J. Morrissey

[57] ABSTRACT

Integrally formed grid structures made of composite graphite-epoxy material are disclosed in which graphite fibers extend three-dimensionally in at least three different directions.

9 Claims, 27 Drawing Sheets

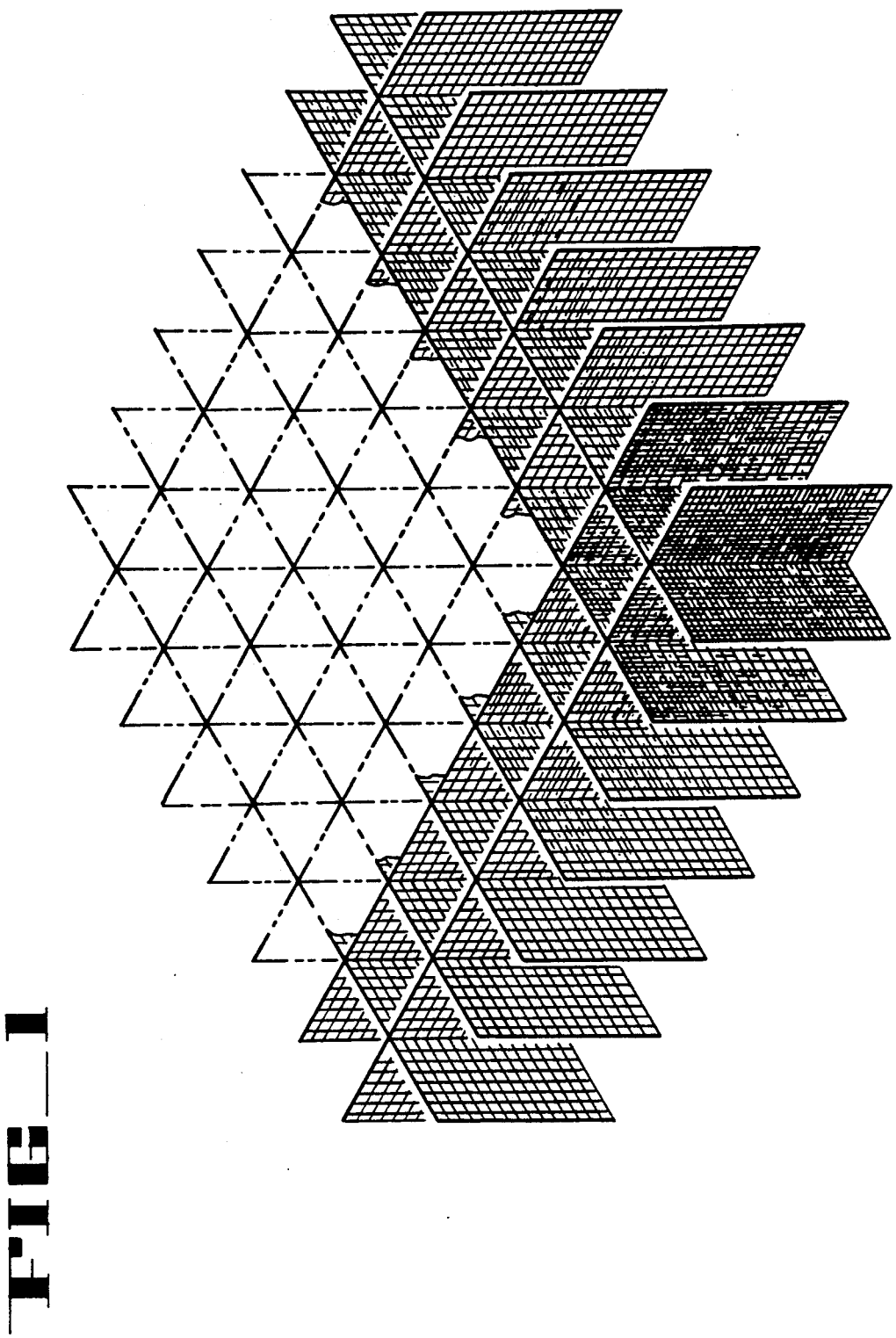
FIG_1

FIG_3
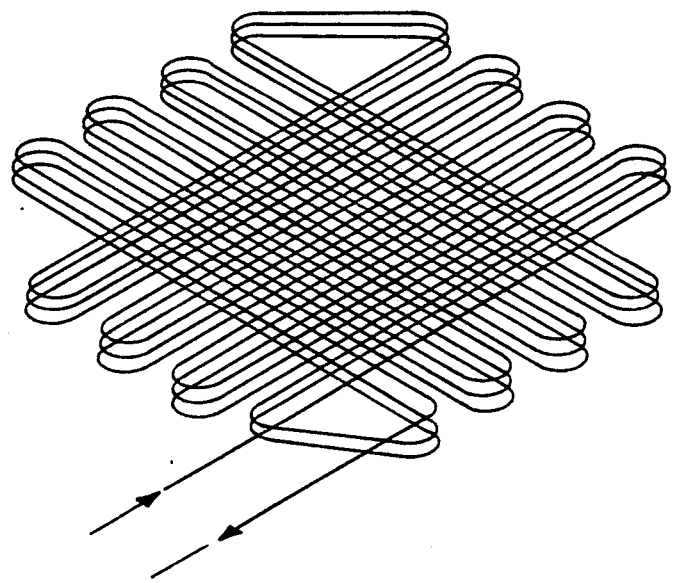
FIG_2
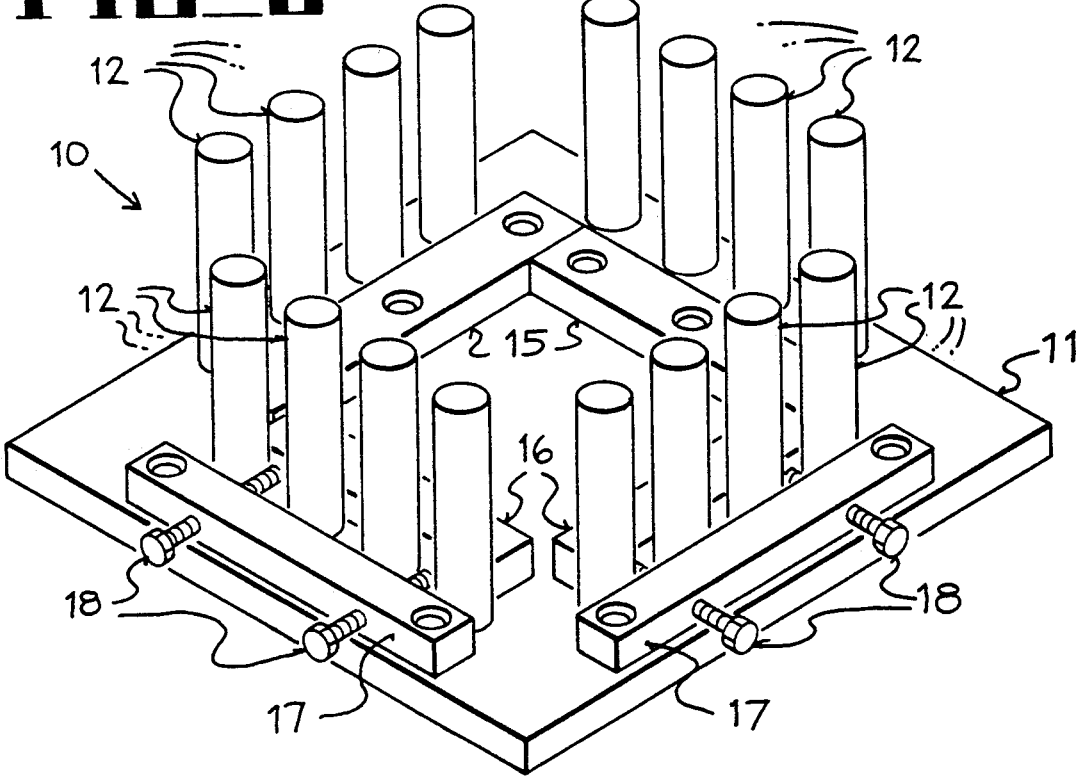

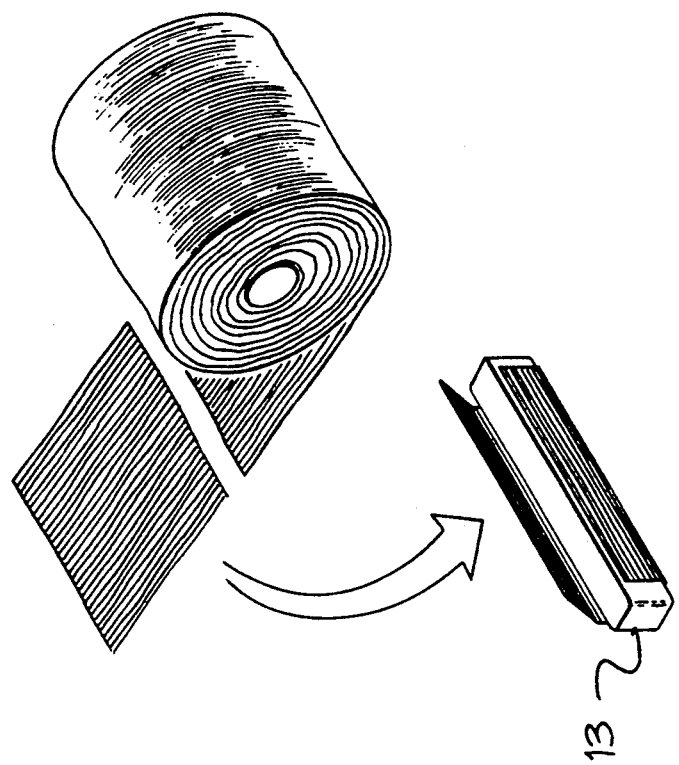
FIG_5
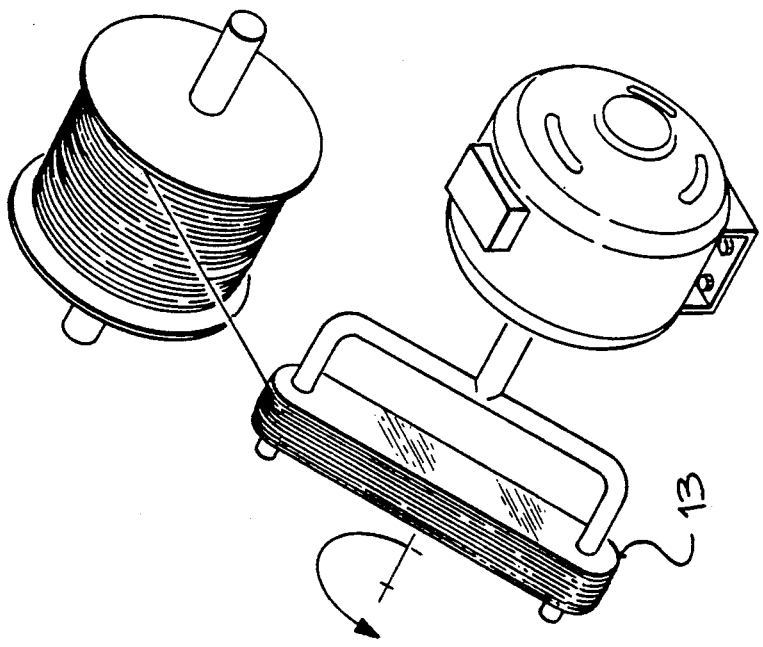
FIG_4

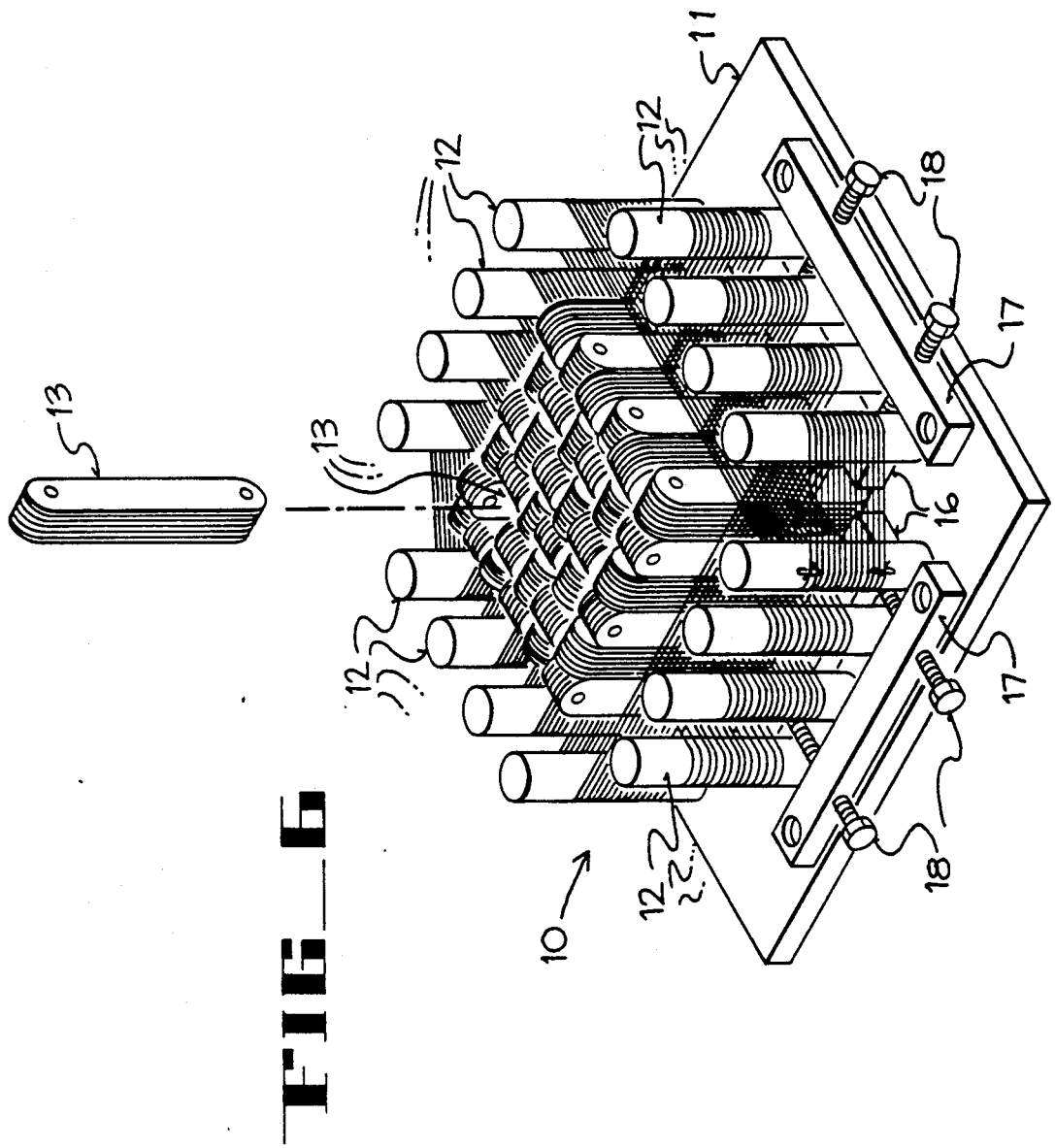

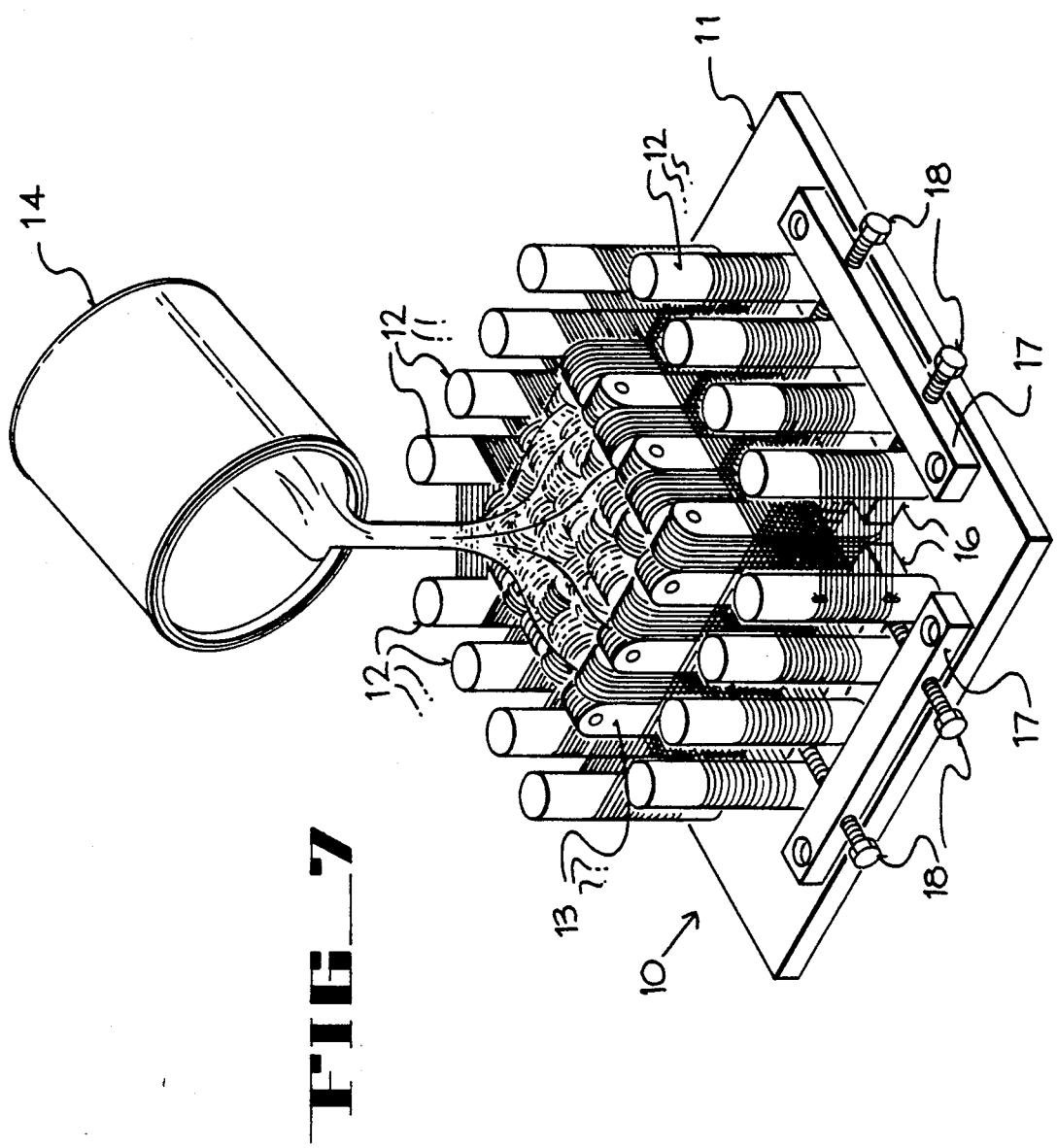

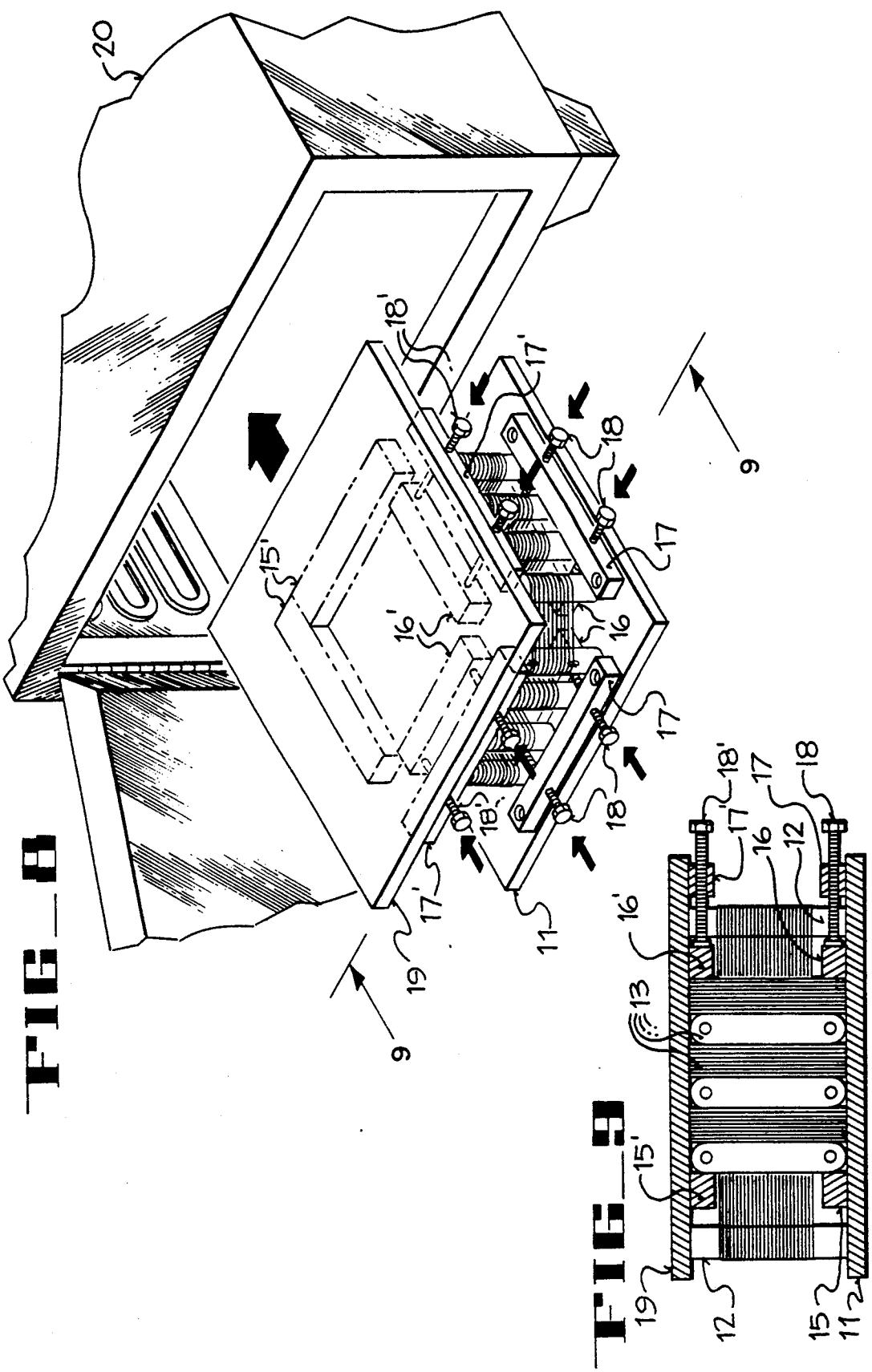

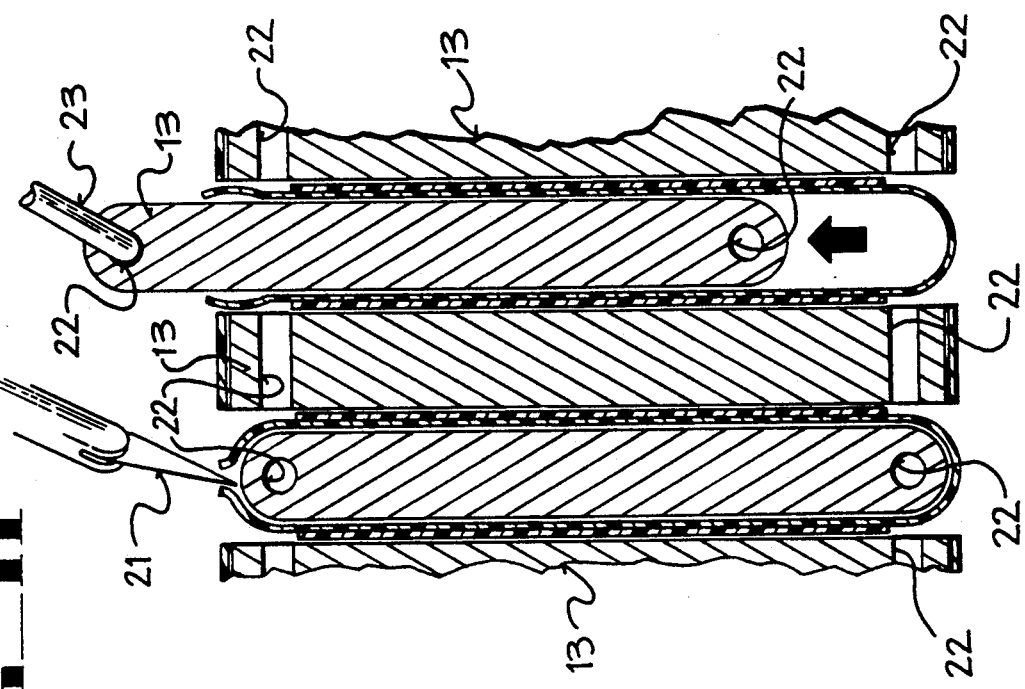
FIG_11
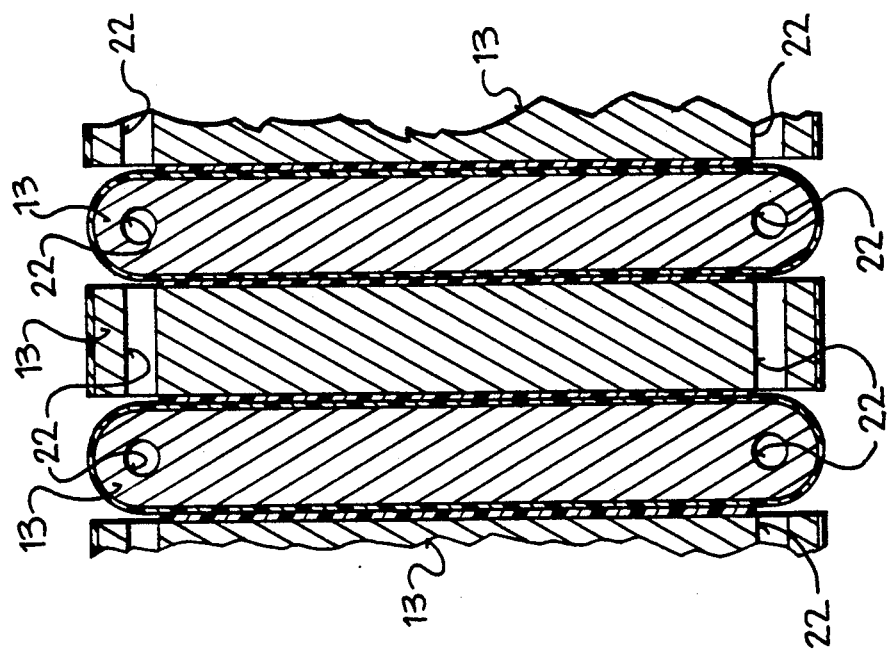
FIG_10

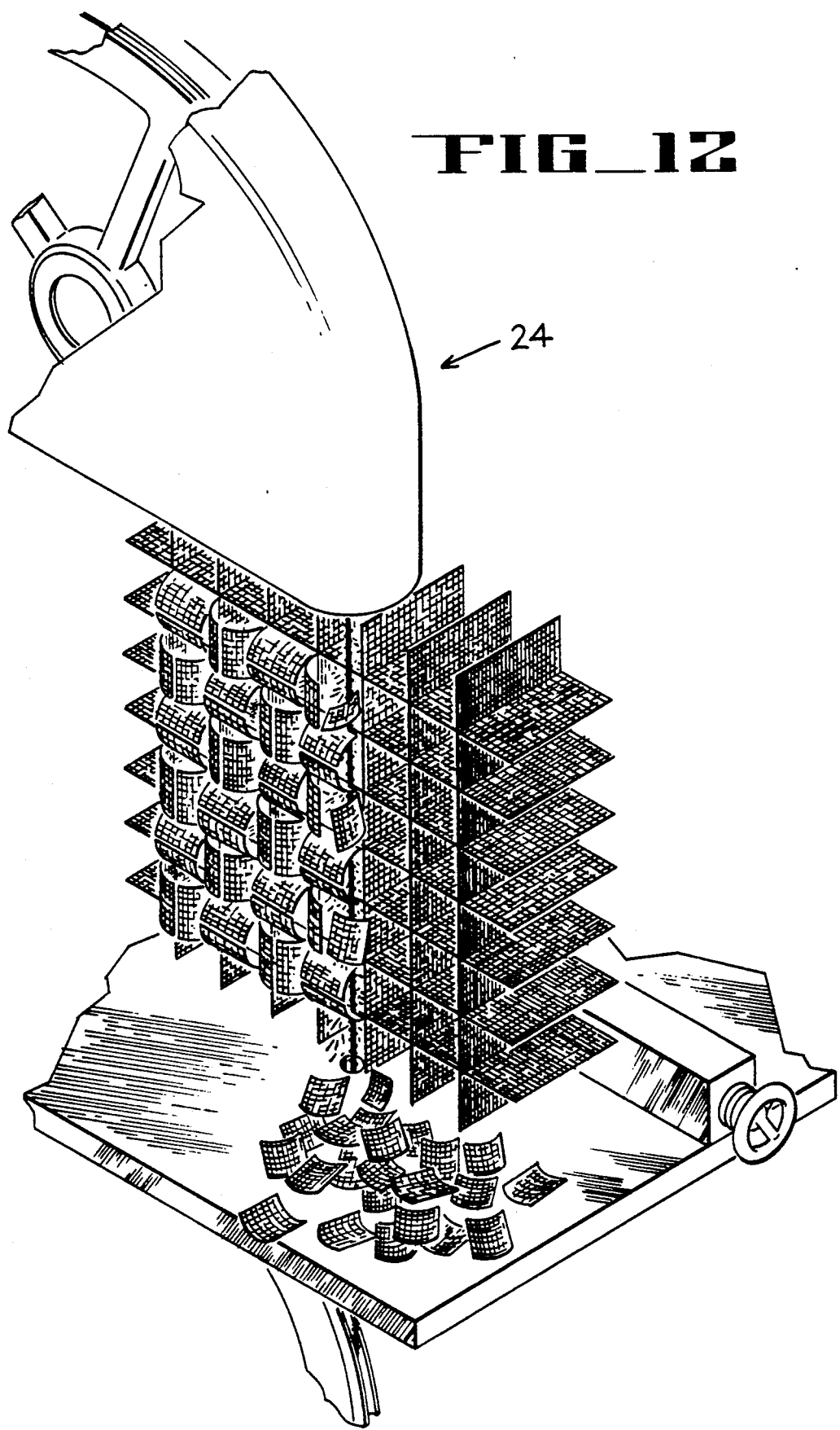

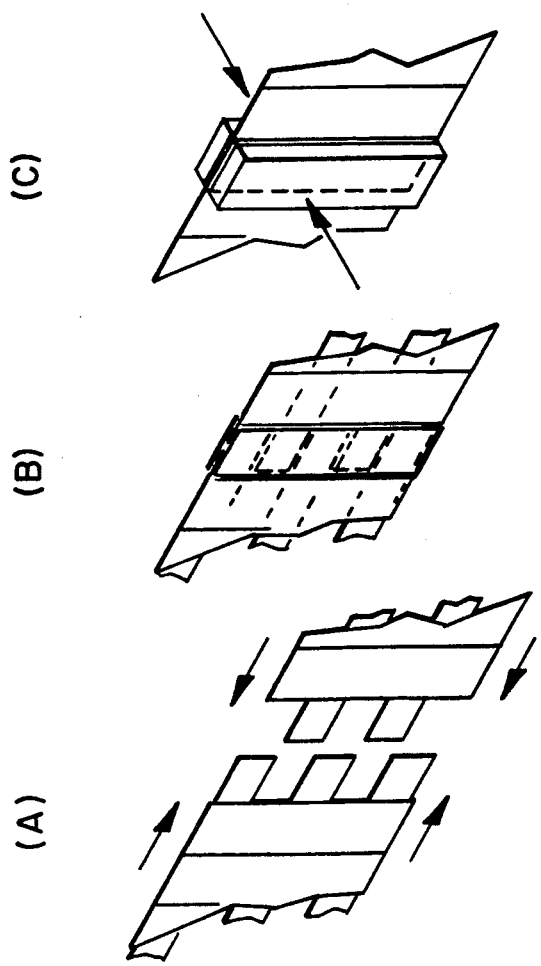
FIG_14
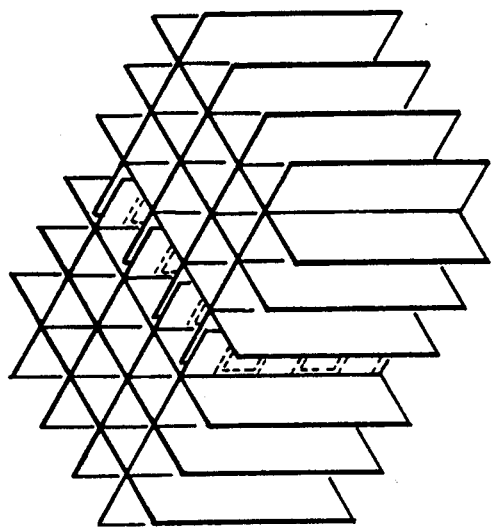
FIG_13

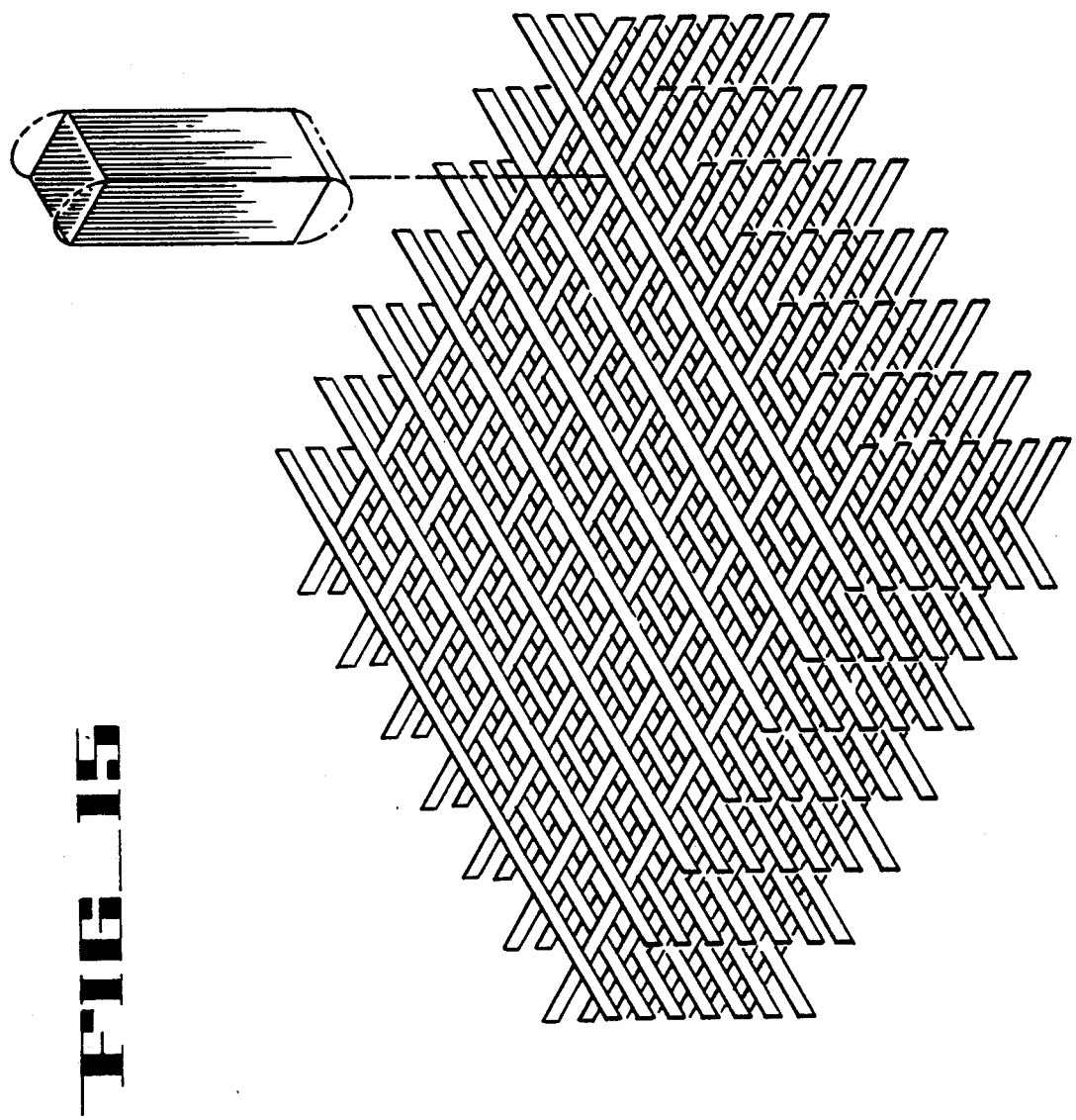
FIG_15

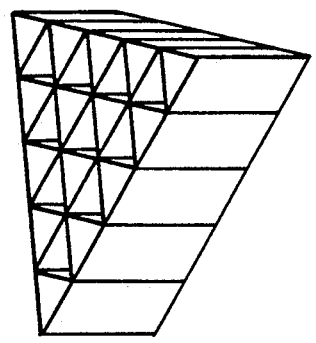
FIG_18
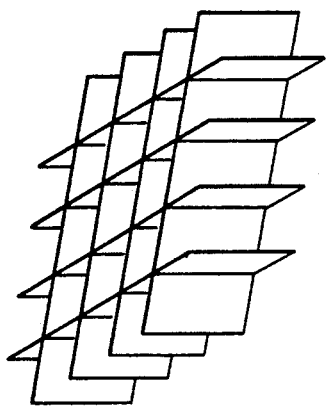
FIG_17
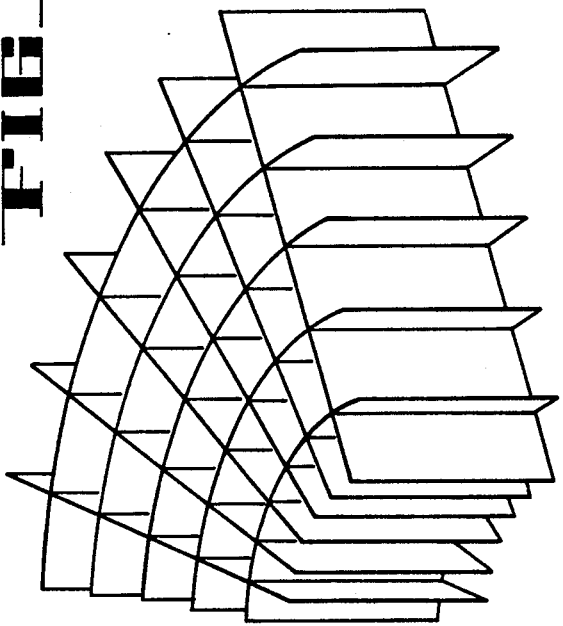
FIG_20
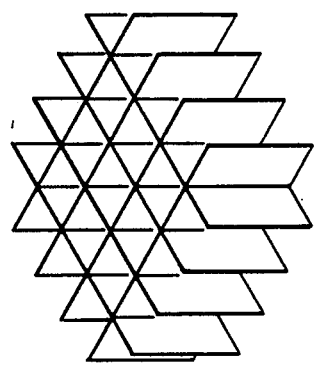
FIG_16
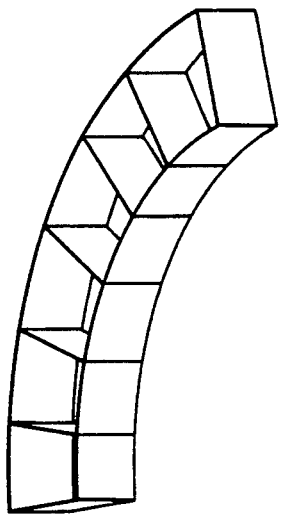
FIG_19

FIG_21
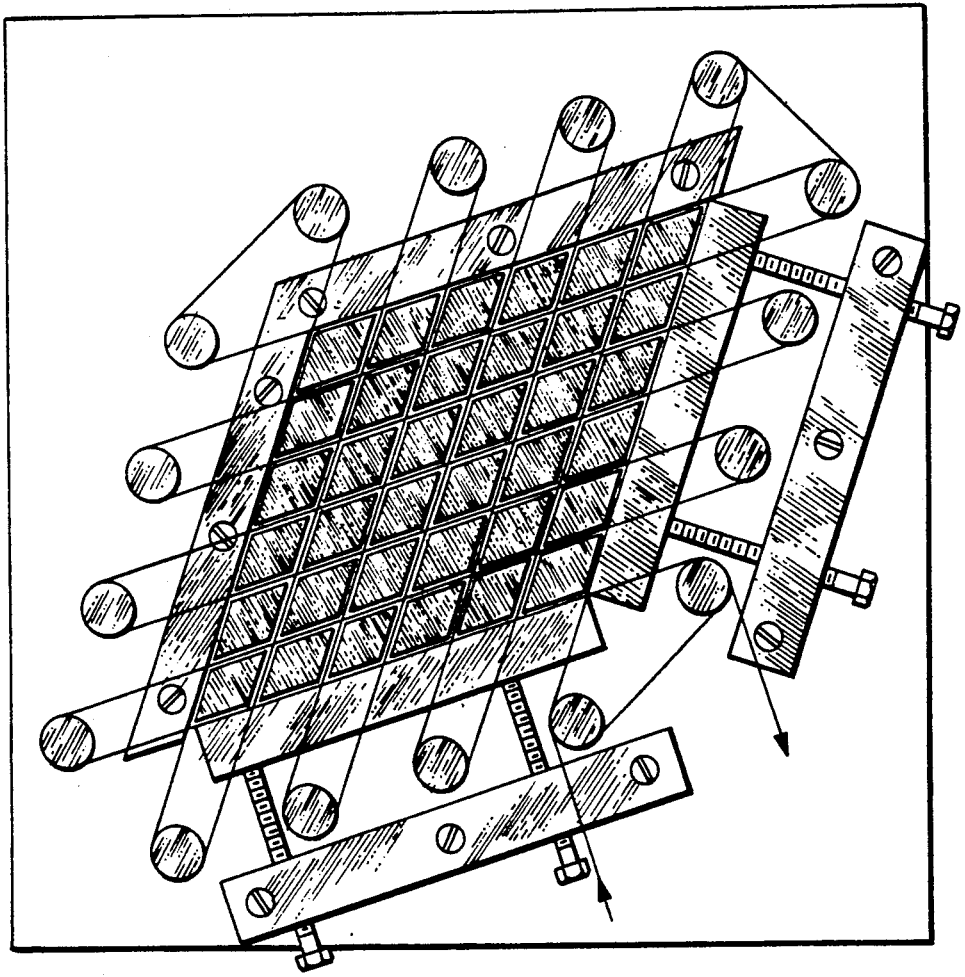

FIG_23
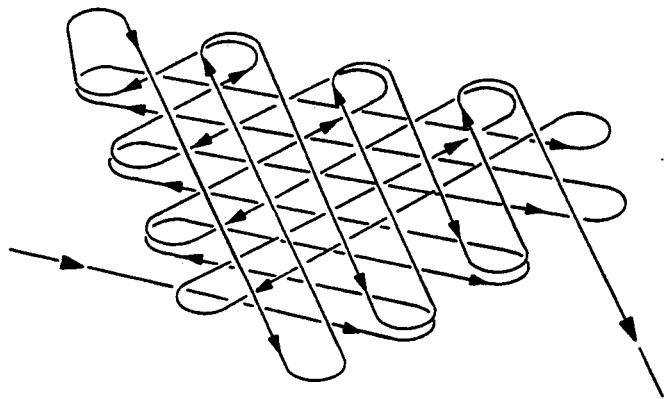
FIG_22
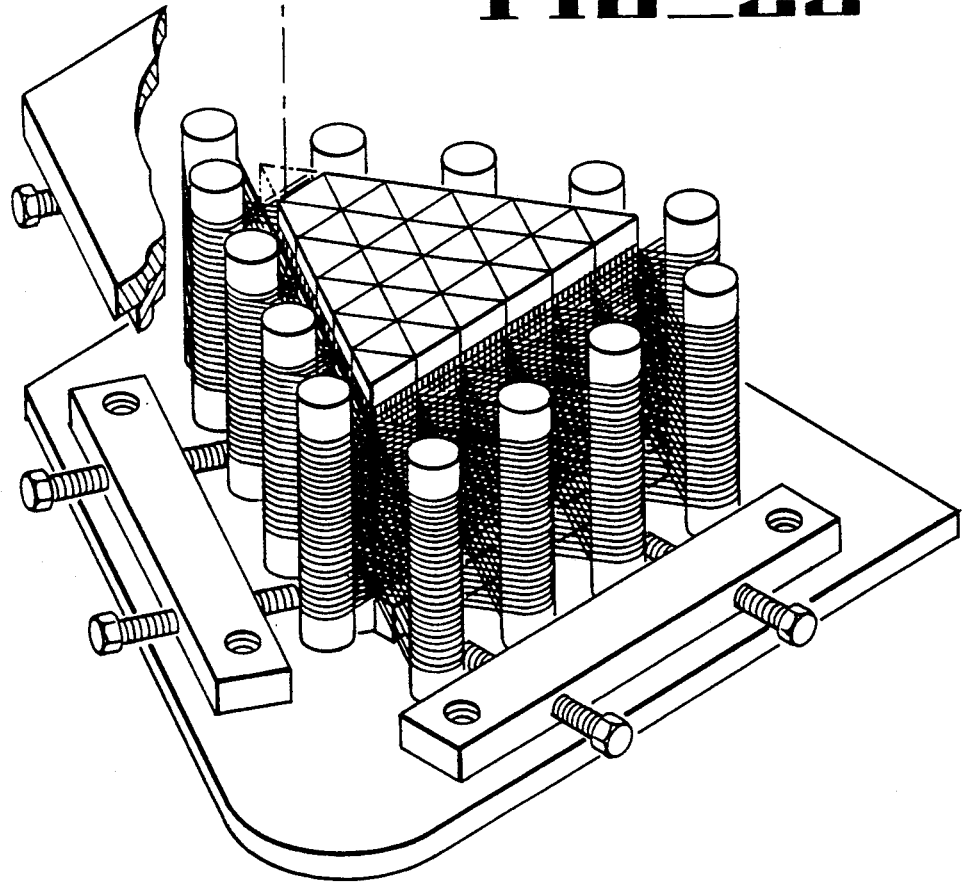

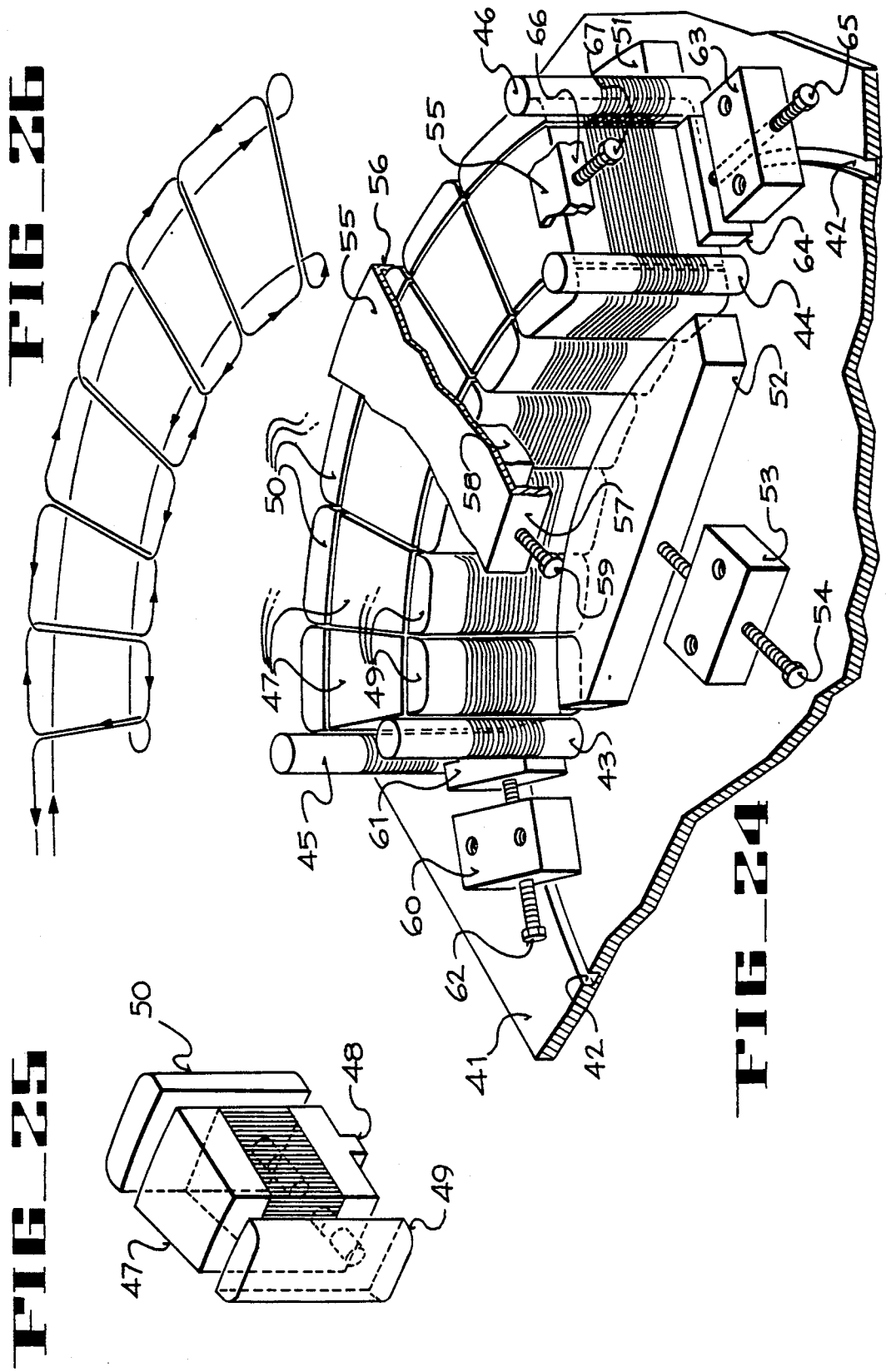

FIG_27
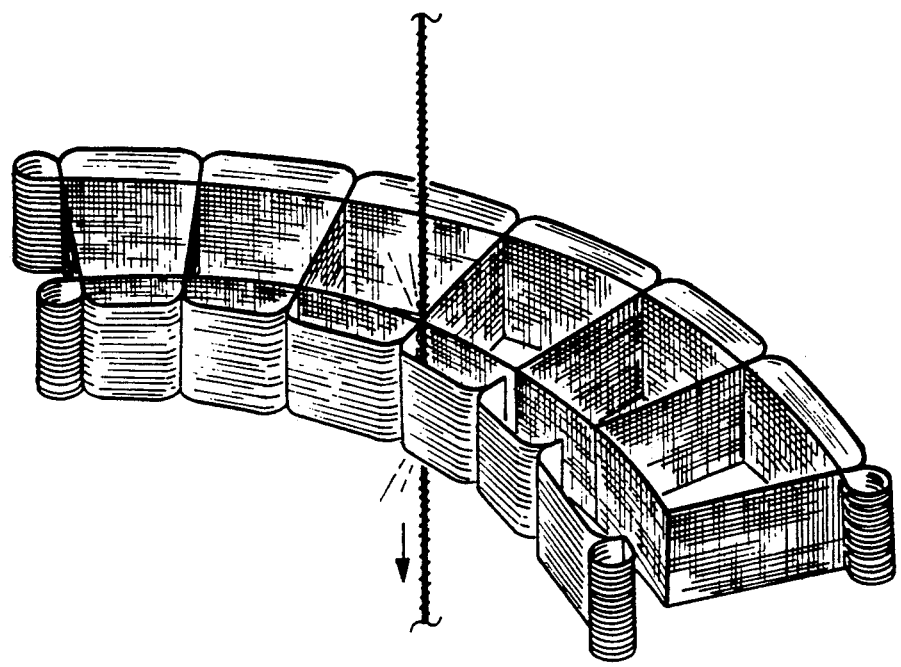
FIG_28
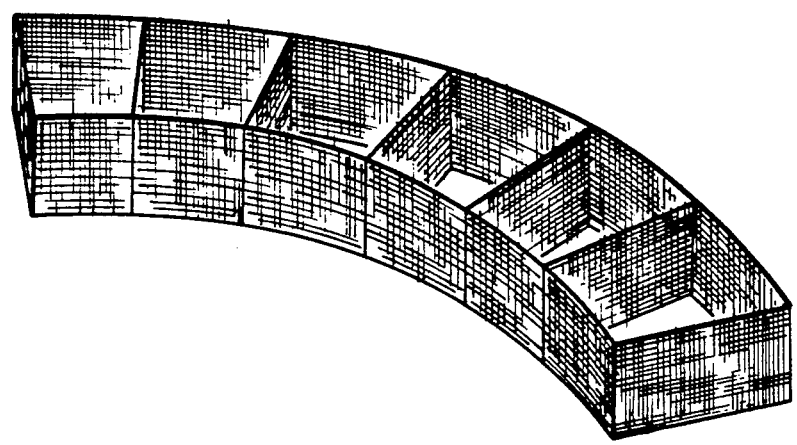

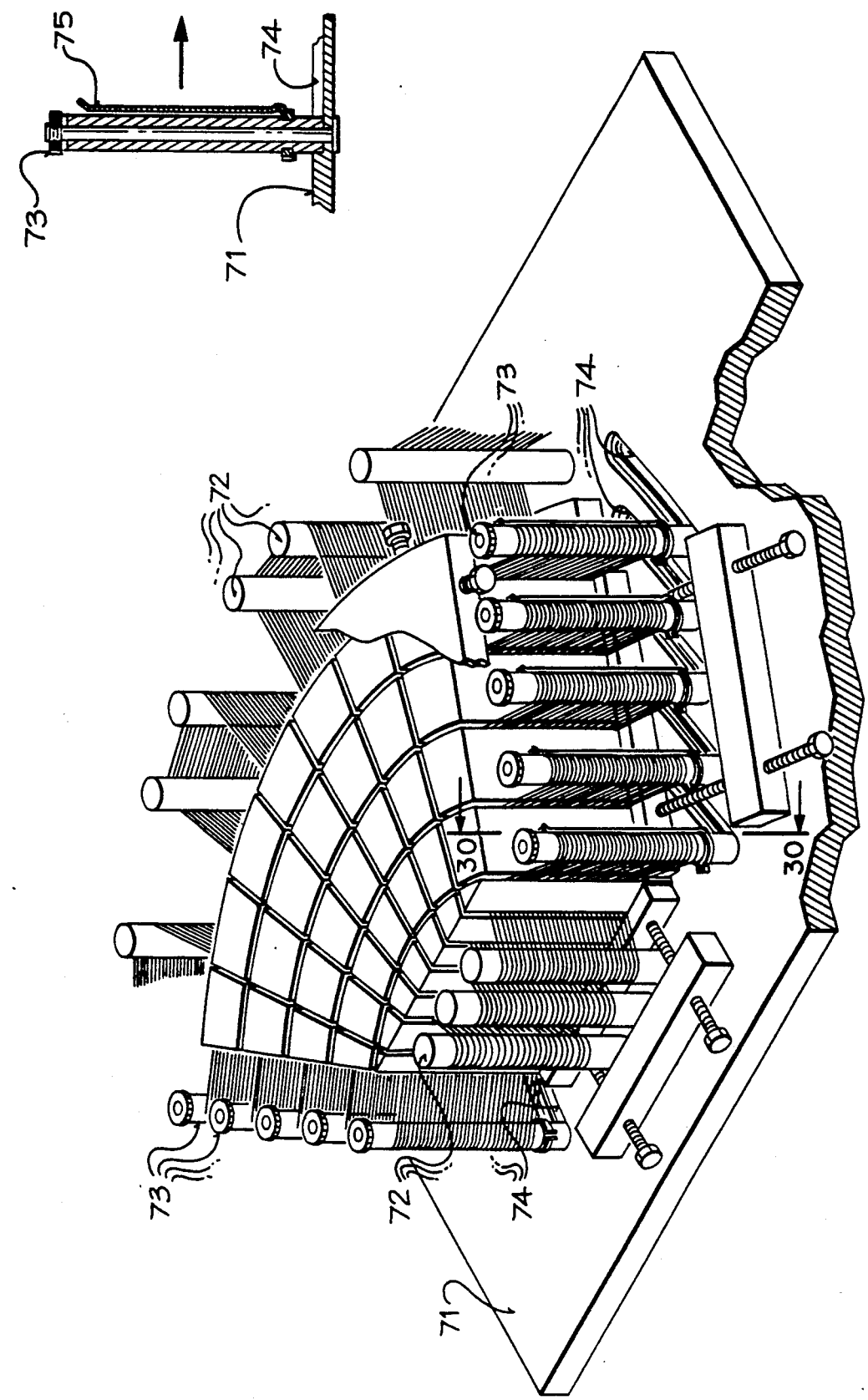

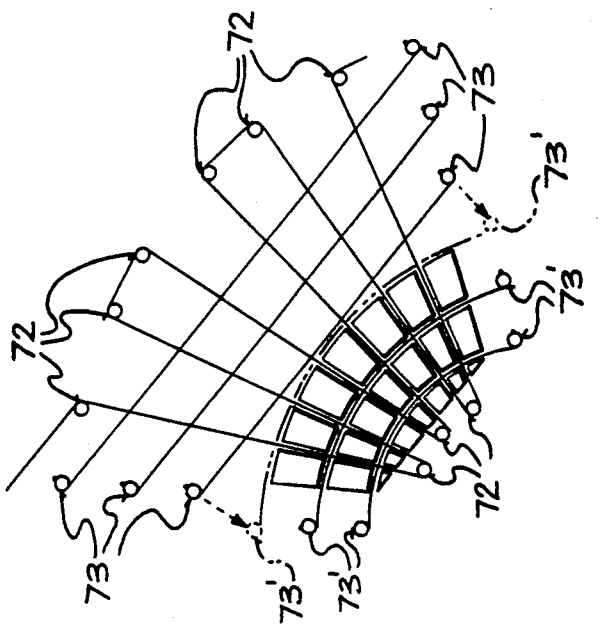
FIG_31A
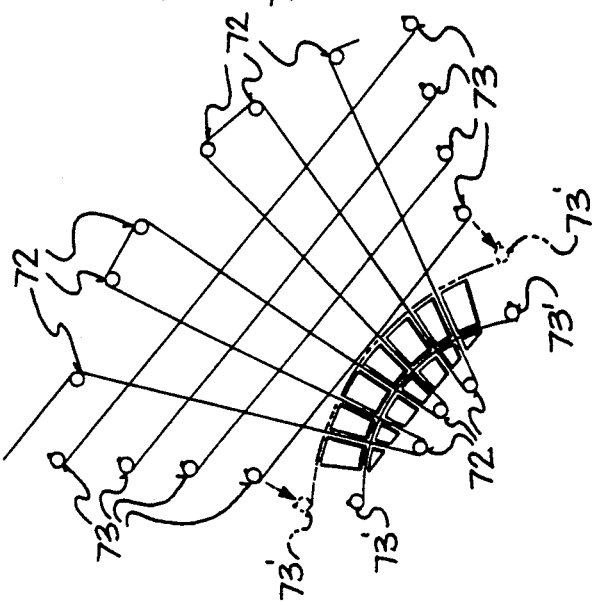
FIG_31B
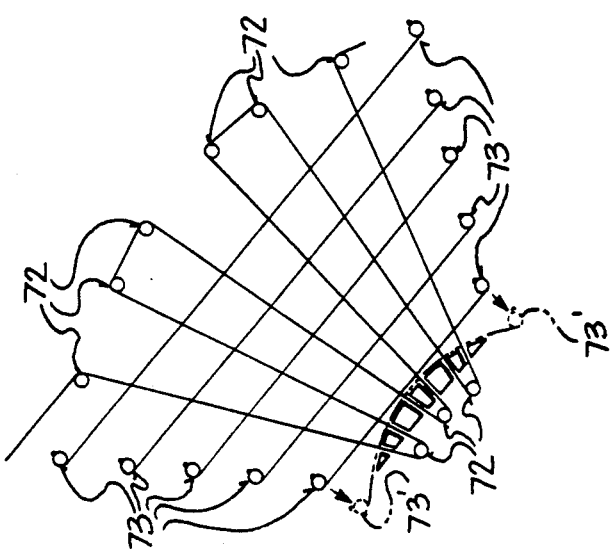
FIG_31C

FIG_32
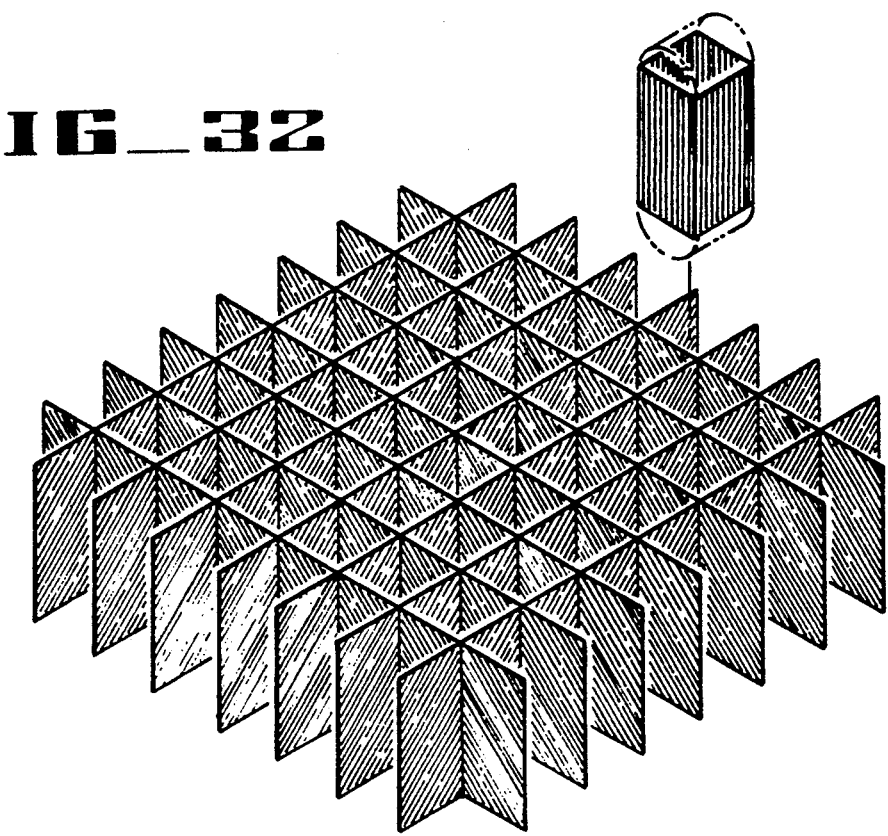
FIG_33
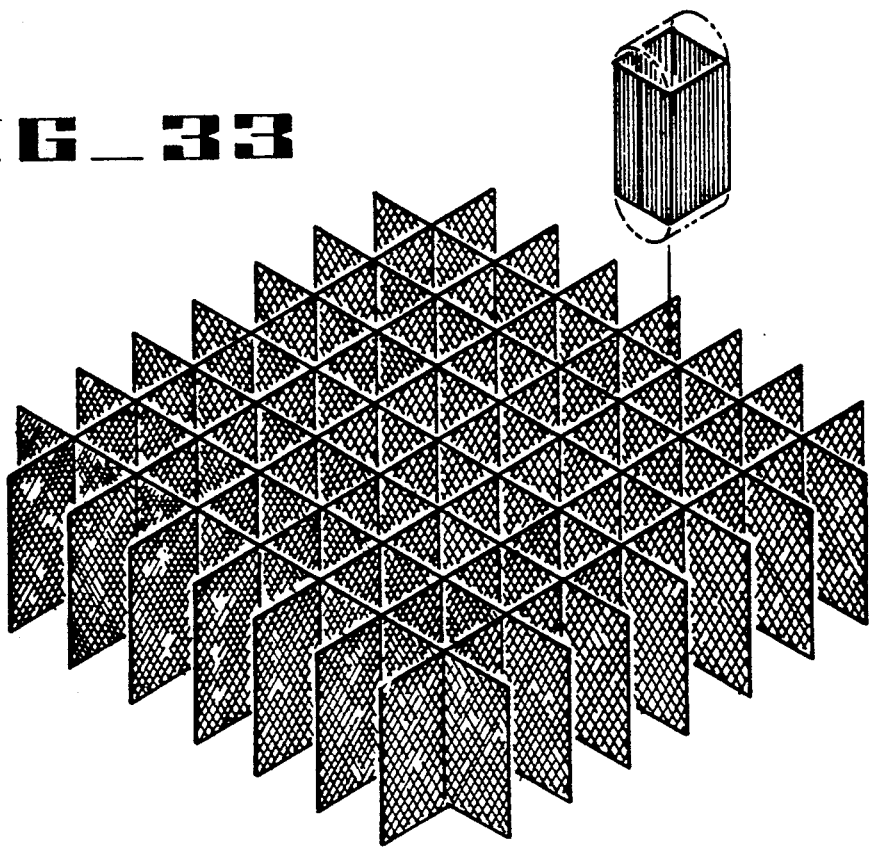

FIG_34
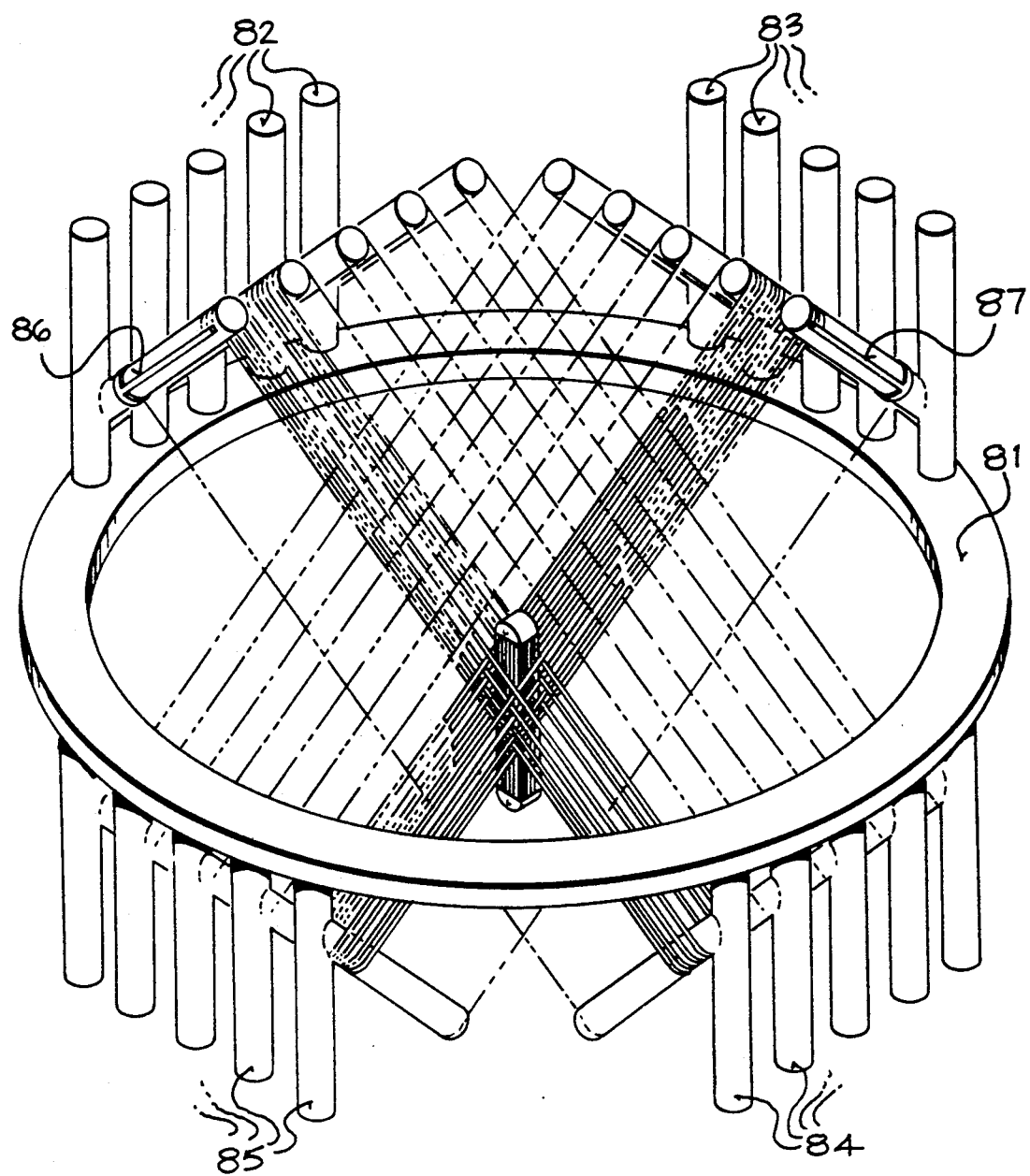

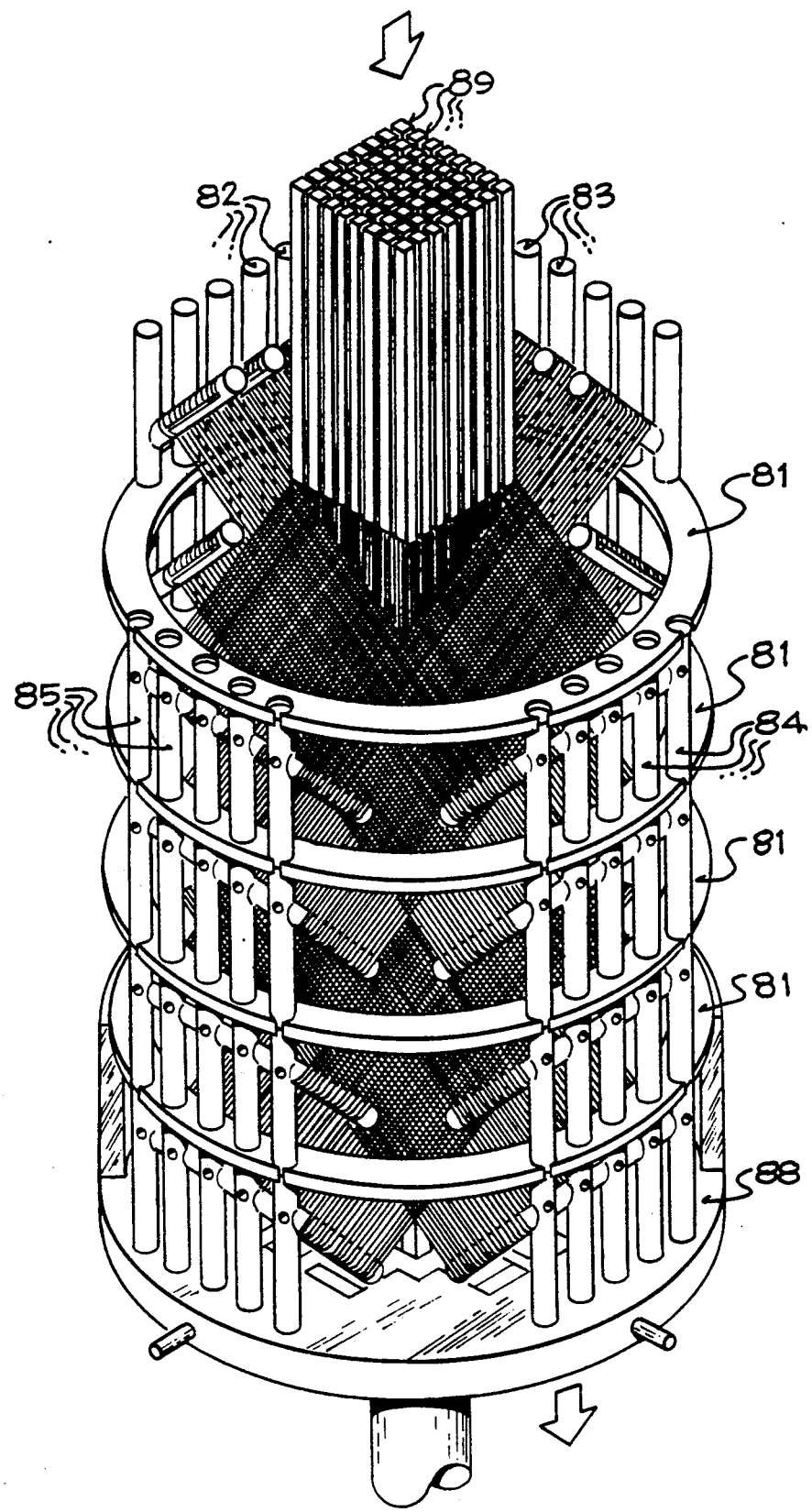
FIG_35

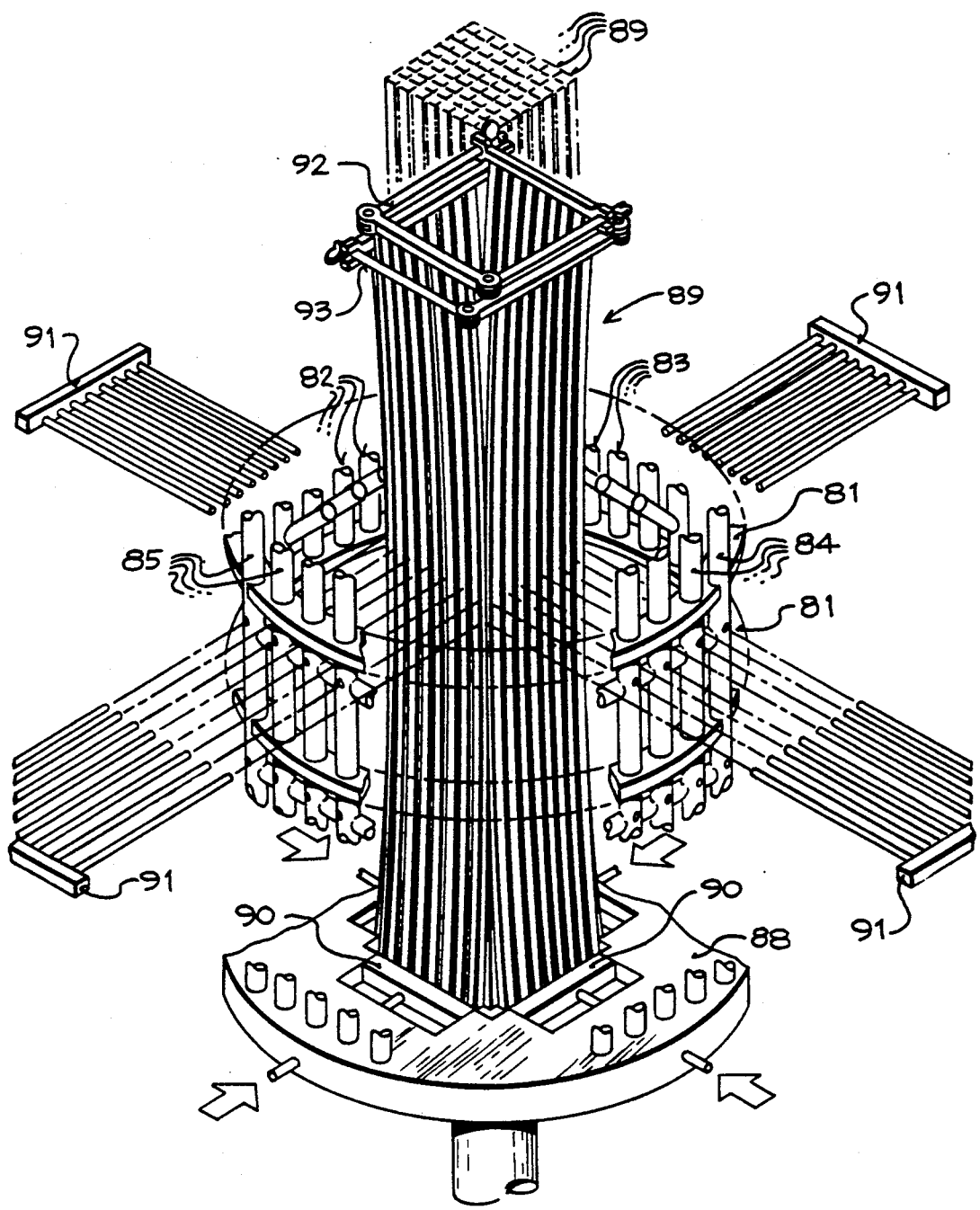

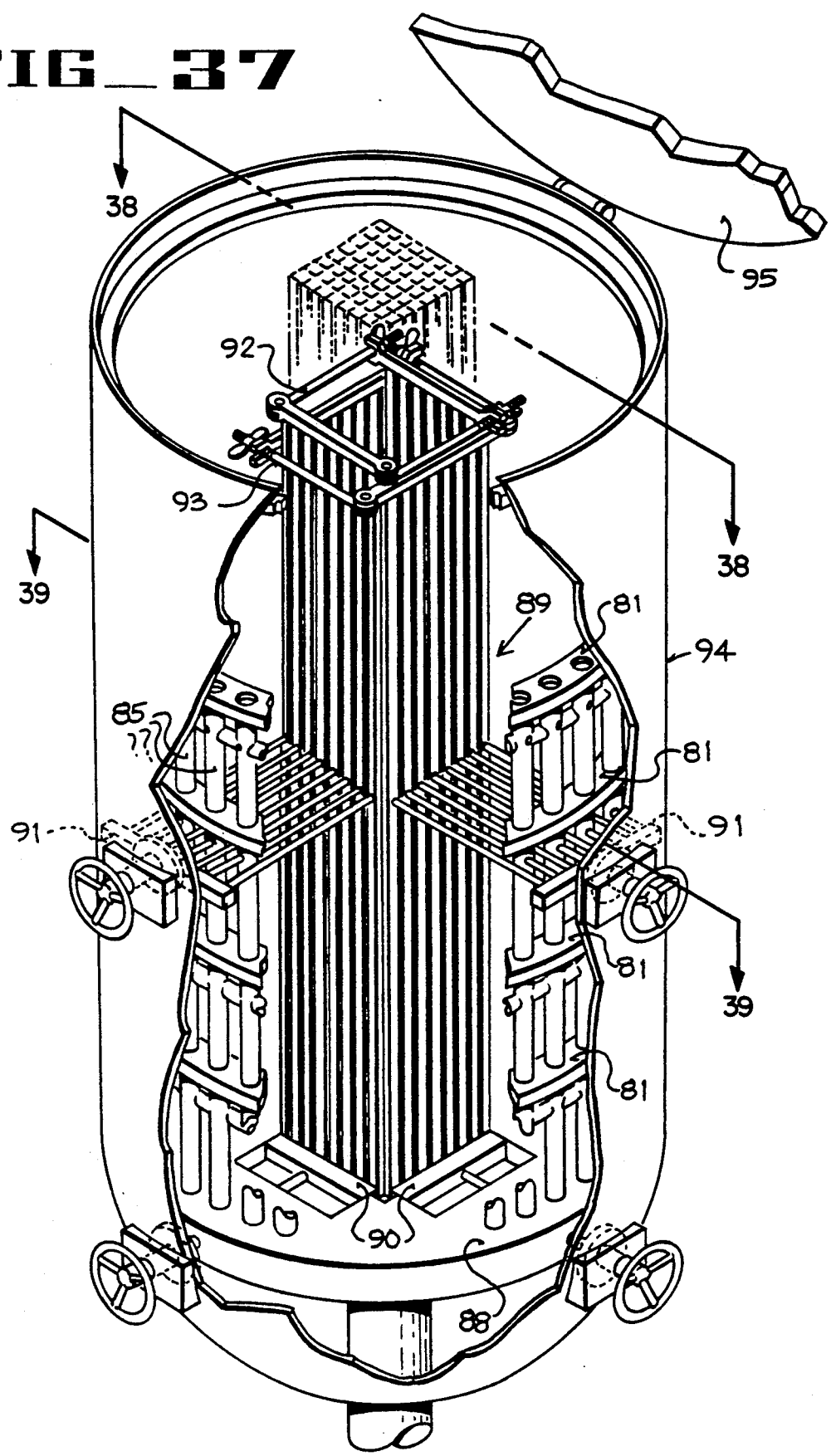

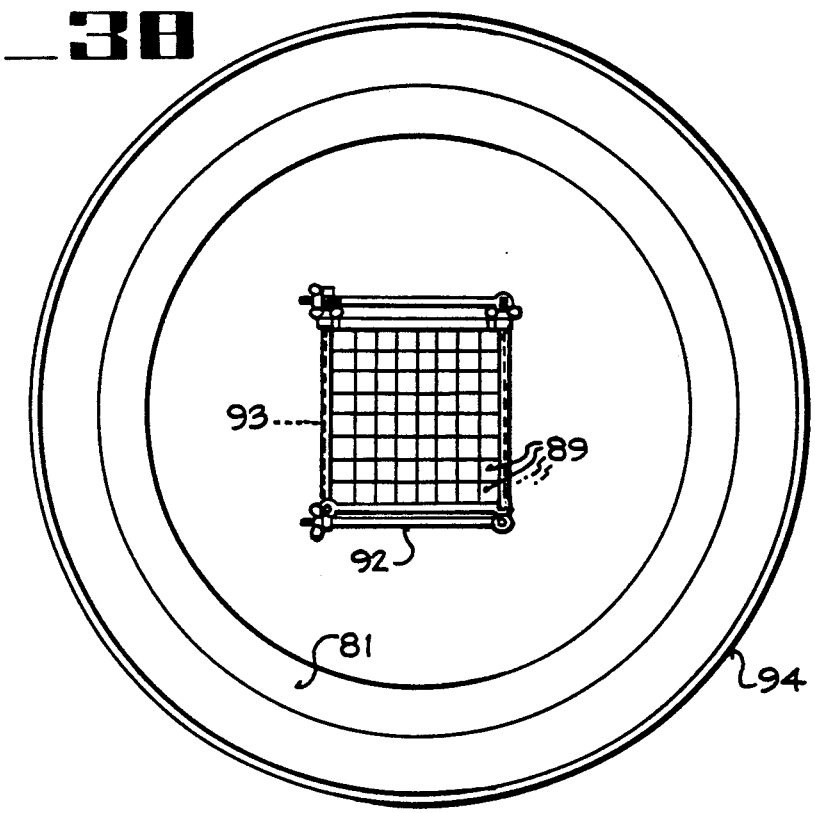
FIG_38
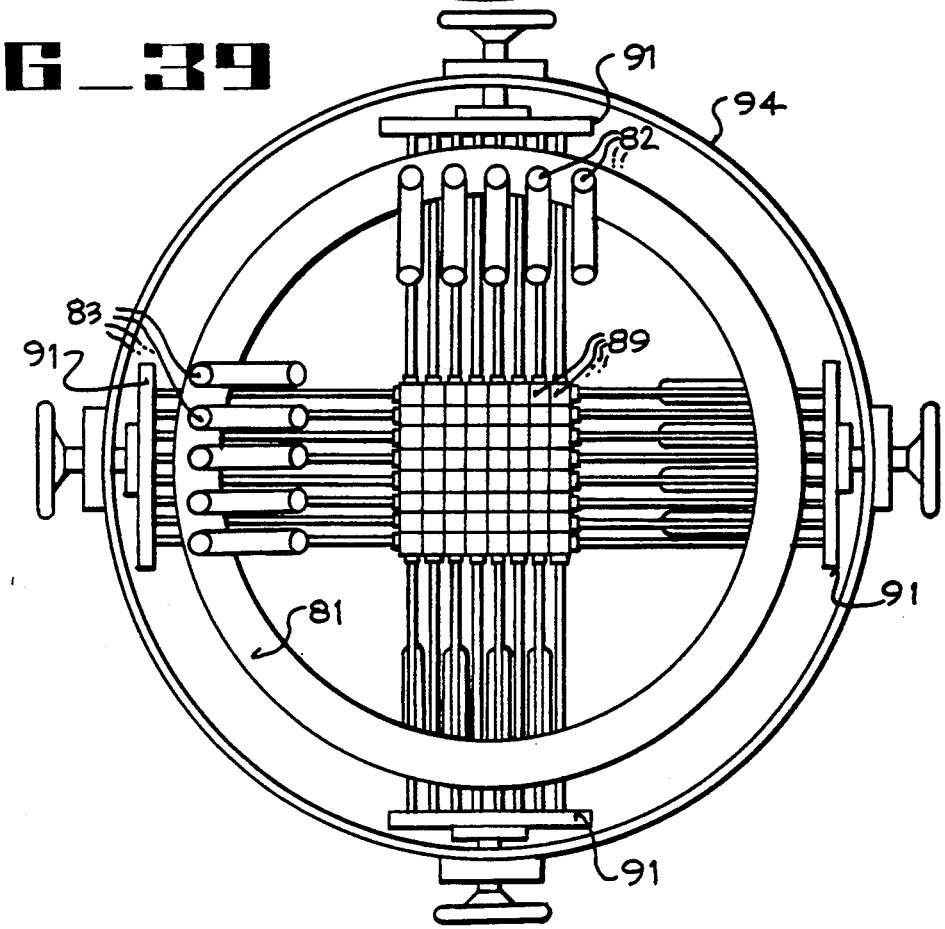
FIG_39

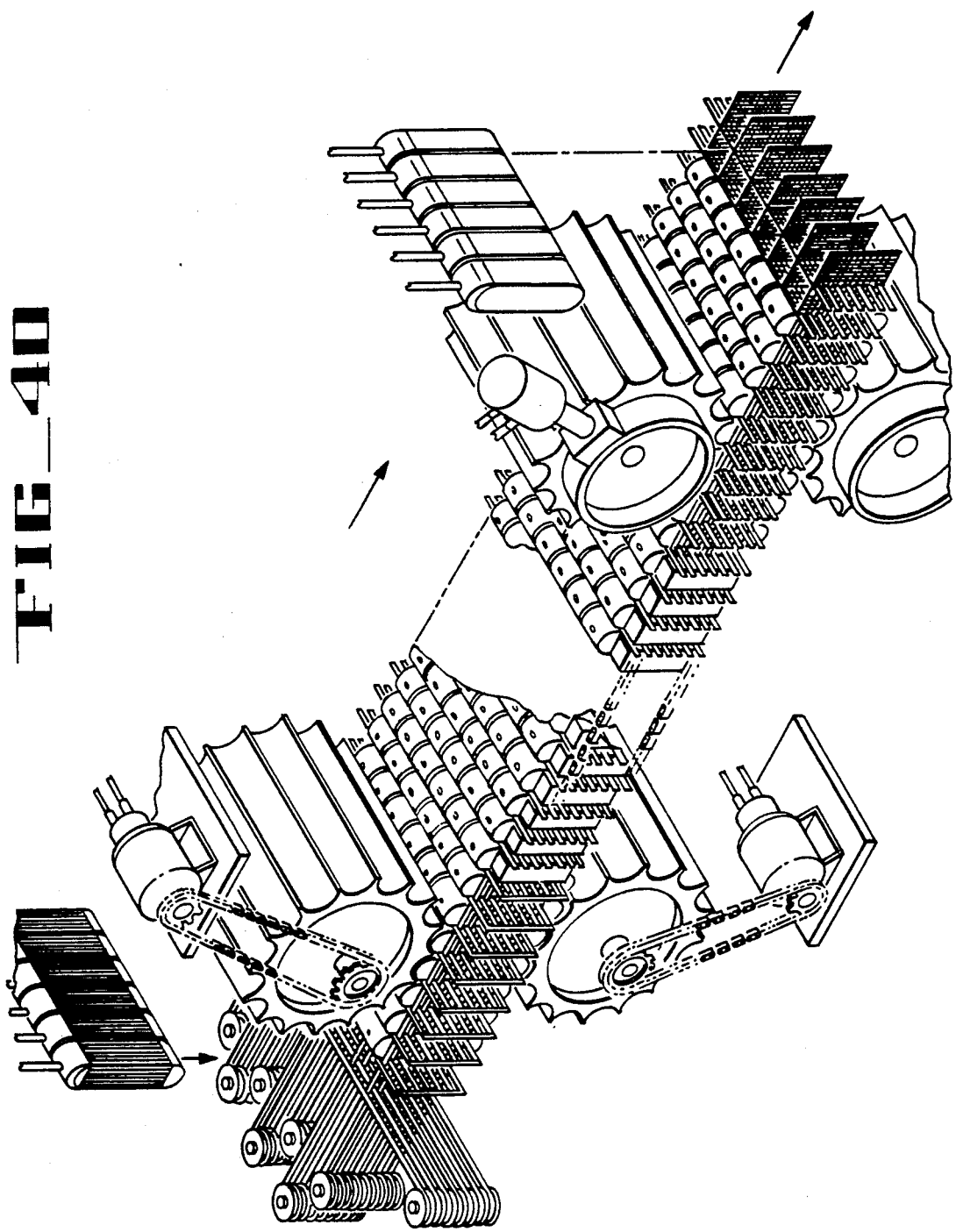
FIG_40

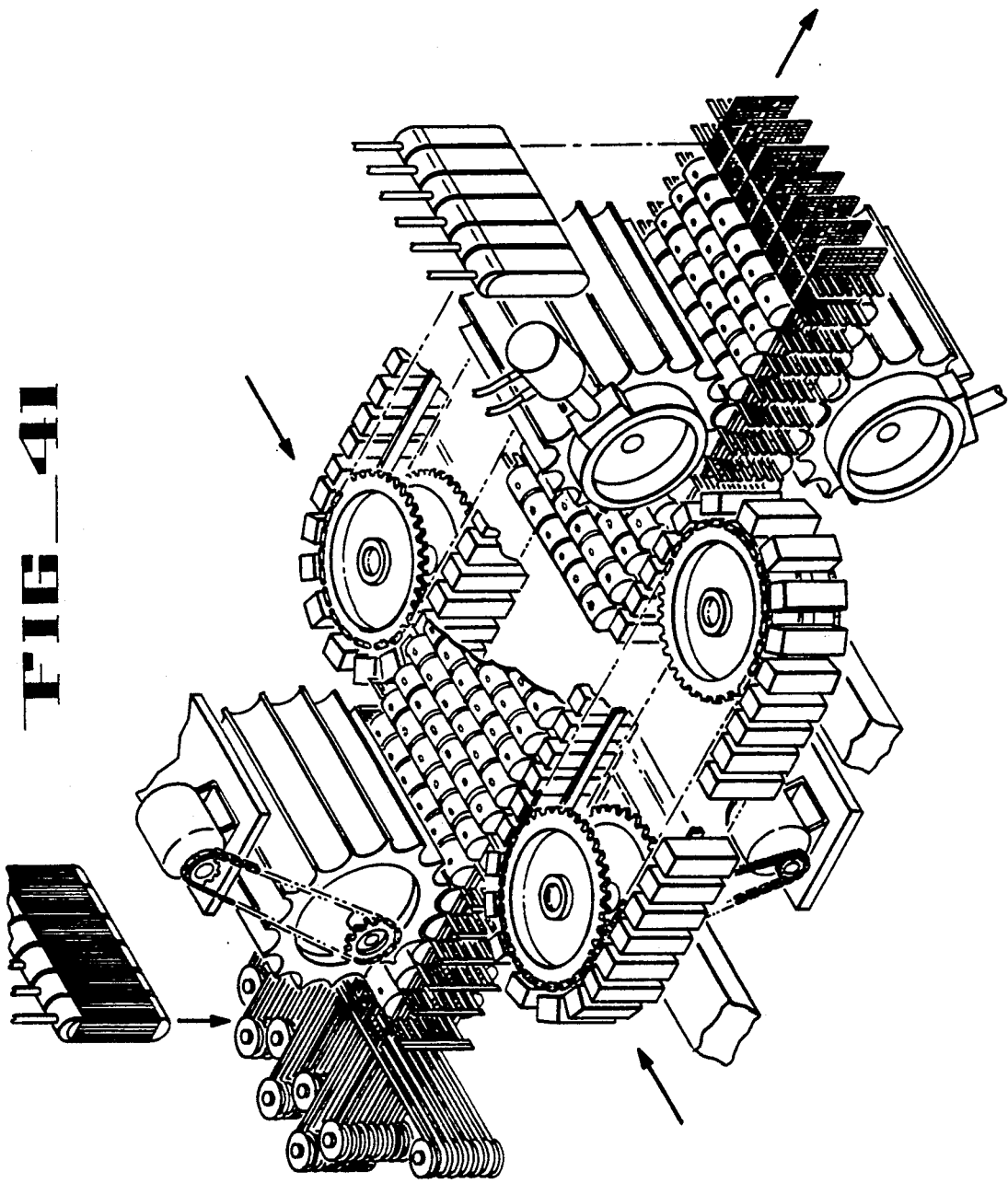

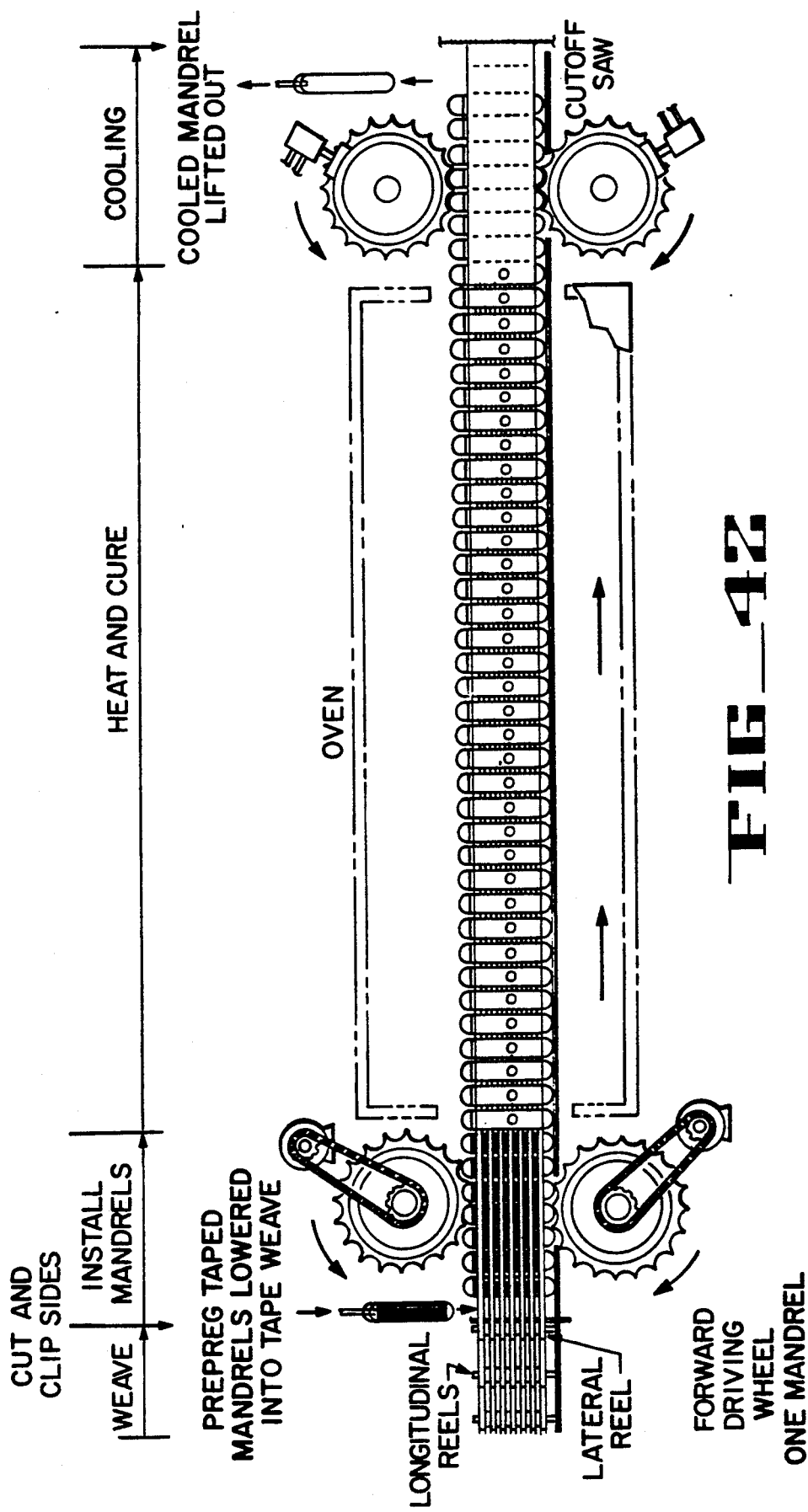

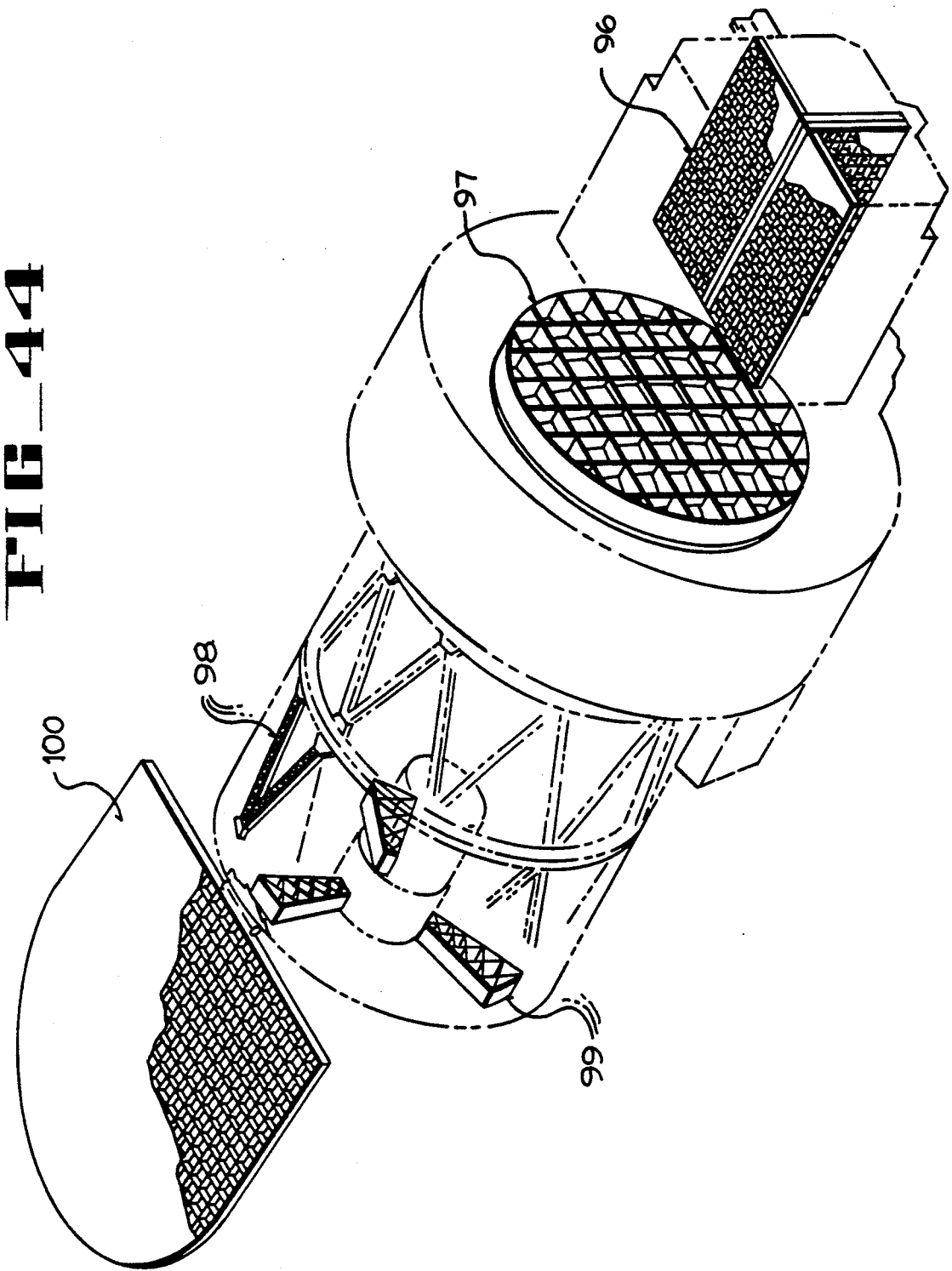

GRID STRUCTURES

TECHNICAL FIELD

This invention relates generally to the fabrication of grid structures, and more particularly to the fabrication of grid structures made from a composite material consisting of fibers embedded in a matrix in which the fibers extend in three different directions.

BACKGROUND ART

Grid structures have been proposed for applications requiring exceptionally light weight and high strength, e.g., for supporting antennas and reflective surfaces in extraterrestrial space. It has further been proposed to fabricate such grid structures from fiber-reinforced matrix materials. In general, a fiber-reinforced matrix material could be formulated using fibers made of graphite, aramide, fiberglass, ceramic material, metallic material or thermoplastic material, and using a matrix made of a thermosetting resin (e.g., epoxy, polyester, phenolic, polymide) or a thermoplastic material. Graphite-epoxy composites are well-known fiber-reinforced matrix materials.

In the prior art, grid structures were typically fabricated by bonding together separate panels (called "grid sections"), which could be either planar or curved, to form structures of "eggcrate" or "honeycomb" configuration.

In a typical grid structure of eggcrate configuration in the prior art, separate grid sections appear to intersect each other so as to define interstices that are arrayed in a geometrically regular pattern resembling an eggcrate. However, the intersecting grid sections of a typical eggcrate-type grid structure of the prior art do not actually intersect each other in the sense that two abstract mathematical surfaces (planar or curved) can penetrate each other without breaching the integrity of either surface. When two grid sections of a typical eggcrate-type grid structure of the prior art "intersect" each other, it is generally necessary that at least one grid section (or a portion thereof) be cut so that the other grid section (or a portion thereof) can be positioned in the cut. The two "intersecting" grid sections are then bonded to each other by an adhesive bonding material, which is ordinarily spread along edges of the cut.

In a typical grid structure of honeycomb configuration in the prior art, separate grid sections are corrugated so as to have flat surface portions that are usually equally spaced with respect to each other. The flat surface portions of each grid section are positioned in contact with corresponding flat surface portions of adjacent grid sections, and the contacting surface portions of the adjacent grid sections are adhesively bonded together to define interstices between the adjacent grid sections. The resulting interstices are arrayed in a geometrically regular pattern resembling a honeycomb.

In a conventional eggcrate-type or honeycomb-type of grid structure, the strength of the grid structure necessarily depends upon the strength of the adhesive bonds by which the intersecting or contacting grid sections are secured to each other. In general, a grid structure of the eggcrate type is most prone to failure at the places where cuts have been made in intersecting grid sections, and a grid structure of the honeycomb type is most prone to failure at the places where contacting surface portions of adjacent grid sections are bonded together.

In a conventional eggcrate-type or honeycomb-type of grid structure, the weight of the adhesive bonding material that is applied where separate grid sections intersect or make contact with each other generally introduces a nonuniformity in weight distribution throughout the grid structure. Furthermore, inhomogeneities occurring in the adhesive bonding material can cause structural weaknesses in the grid structure.

SUMMARY OF THE INVENTION

It is an object of the present invention to provide a technique for fabricating a grid structure from a composite material consisting of fibers embedded in a matrix in which the fibers extend in at least three different directions.

It is a feature of a grid structure according to the present invention that substantial uniformity in strength is obtained throughout the grid structure, and that variations in weight distribution throughout the grid structure are practically insignificant.

In accordance with a preferred embodiment of the present invention, a grid structure made from a composite material consisting of fibers embedded in a matrix (e.g., a graphite-epoxy composite material) is fabricated by a process that includes the following steps: (a) weaving a filament made of fibrous material into a pattern defining interstices of the grid structure, (b) winding filaments made of fibrous material onto mandrels that conform in cross-sectional configuration to the interstices of the grid structure as defined by the woven filament, (c) inserting the mandrels with the filaments wound thereon into corresponding interstices of the grid structure, (d) impregnating the fibrous material with a liquid matrix material, (e) compressing the fibrous material impregnated with liquid matrix material between the mandrels in adjacent interstices, (f) curing the matrix material to form the grid structure, and (g) removing the mandrels from the interstices after the matrix material has cured.

DESCRIPTION OF THE DRAWING

FIG. 1 is a perspective view of a three-dimensional grid structure of eggcrate configuration made from a graphite-epoxy composite material in accordance with the present invention.

FIG. 2 is a perspective view of a loom for use in weaving a graphite filament into a grid structure having the configuration shown in FIG. 1.

FIG. 3 is a representation in perspective view of three successive paths over the loom shown in FIG. 2 by a graphite filament being woven into a grid structure having the configuration shown in FIG. 1.

FIG. 4 is a perspective view of a mandrel being wound with a graphite filament for insertion into an interstice defined by intersecting planes formed by weaving a graphite filament on the loom shown in FIG. 2.

FIG. 5 is a perspective view of a mandrel being wrapped with a tape comprising resin-impregnated graphite fibers for insertion into an interstice defined by intersecting planes formed by weaving a graphite filament on the loom shown in FIG. 2.

FIG. 6 is a perspective view illustrating mandrels (which may be filament-wound or tape-wrapped, as shown in FIGS. 4 and 5, respectively) being inserted into corresponding interstices defined by intersecting planes formed by weaving a graphite filament on the loom shown in FIG. 2.

FIG. 7 is a representation in perspective view of a technique whereby the graphite filaments on the loom and on the mandrels shown in FIG. 6 are impregnated with epoxy resin.

FIG. 8 is a perspective view illustrating resin-impregnated graphite filaments compressed together on the loom and mandrels shown in FIG. 6, and illustrating the loom and mandrels with the compressed graphite filaments thereon being inserted into an oven for curing of the resin.

FIG. 9 is a cross-sectional view along line 9—9 of FIG. 8.

FIG. 10 is a fragmentary cross-sectional view schematically illustrating filament-wound mandrels in a row of interstices defined by intersecting planes formed by the graphite filament woven on the loom shown in FIG. 6.

FIG. 11 is a fragmentary cross-sectional view as in FIG. 10 illustrating a technique for removing the mandrels from the interstices after the resin has been cured.

FIG. 12 is a perspective view illustrating a technique using a diamond wire saw for trimming end portions from a three-dimensional grid structure made according to the present invention.

FIG. 13 is a perspective view showing two grid structures as illustrated in FIG. 1 being joined together to form a larger grid structure.

FIG. 14 illustrates three successive steps in a technique for joining two grid structures together to form the larger grid structure shown in FIG. 13.

FIG. 15 is a perspective view schematically illustrating an alternative technique according to the present invention, whereby the intersecting planes defining the interstices of a three-dimensional grid structure of eggcrate configuration are formed by stacking tapes of resin-impregnated graphite fibers rather than by weaving a graphite filament as in FIG. 6.

FIG. 16 is a sketch in perspective view of the grid structure of FIG. 1 wherein the interstices of the grid structure are of square cylindrical configuration.

FIG. 17 is a sketch in perspective view of an alternative configuration for a grid structure according to the present invention wherein the interstices of the grid structure are of rhomboidally cylindrical configuration.

FIG. 18 is a sketch in perspective view of another alternative configuration for a grid structure according to the present invention wherein the interstices of the grid structure are of triangularly cylindrical configuration.

FIG. 19 is a sketch in perspective view of a grid structure of arcuate configuration according to the present invention.

FIG. 20 is a sketch in perspective view of an alternative configuration for a grid structure according to the present invention, wherein each of the interstices of the grid structure is defined by two concentrically cylindrical surfaces having different radii with respect to a cylindrical axis and by two planar surfaces extending radially from the cylindrical axis.

FIG. 21 is a plan view of a loom for use in fabricating a rhomboidal grid structure as sketched in FIG. 17.

FIG. 22 is a perspective view of a loom for use in fabricating a triangular grid structure as sketched in FIG. 18.

FIG. 23 is a representation in perspective view of the path of a graphite filament being woven on the loom shown in FIG. 22.

FIG. 24 is a perspective view of a loom for use in fabricating an arcuate grid structure as sketched in FIG. 19.

FIG. 25 is a perspective view of a mandrel for use on the loom shown in FIG. 24.

FIG. 26 is a representation in perspective view of the path of a graphite filament being woven on the loom shown in FIG. 24.

FIG. 27 is a perspective view illustrating a technique using a diamond wire saw for trimming end portions from an arcuate grid structure as sketched in FIG. 19.

FIG. 28 is a perspective view of the completed arcuate grid structure after having been trimmed as shown in FIG. 19.

FIG. 29 is a perspective view of a loom for use in fabricating a grid structure having coaxial arcuate rows of different radii as sketched in FIG.

FIG. 30 is a cross-sectional view along line 30—30 of FIG. 29.

FIGS. 31A, 31B and 31C schematically illustrate three successive steps in using the loom of FIG. 29 to fabricate a grid structure as sketched in FIG. 20.

FIG. 32 is a perspective view of an alternative embodiment of a grid structure according to the present invention, wherein the graphite filament woven to form the intersecting planes of the grid structure extends in two different directions on each plane, and wherein these two different directions are each oblique with respect to the cylindrical axes of the interstices defined by the intersecting planes.

FIG. 33 is a perspective view of another alternative embodiment of a grid structure according to the present invention, wherein the graphite filament woven to form the intersecting planes of the grid structure crisscrosses itself to form two plies for each intersecting plane.

FIG. 34 is a perspective view of a loom for weaving a graphite filament into a configuration as shown in FIG. 33.

FIG. 35 is a perspective view of a stack of looms of the type shown in FIG. 34 mounted on a base loom for fabricating an elongate grid structure according to the present invention.

FIG. 36 is a perspective view in exploded detail of clamping devices for applying compressional forces to mandrels in the interstices of the grid structure formed on the stack of looms shown in FIG. 3 5.

FIG. 37 is a broken-away perspective view of an oven for curing epoxy resin saturating the graphite filaments of the grid structure formed on the stack of looms shown in FIG. 35.

FIG. 38 is a cross-sectional view along line 38—38 of FIG. 37.

FIG. 39 is a cross-sectional view along line 39—39 of FIG. 37.

FIG. 40 is a simplified perspective view of a continuous-process apparatus for fabricating grid structures according to the present invention.

FIG. 41 is a perspective view of the continuous-process apparatus of FIG. 40 showing additional features of the apparatus, whereby compressional forces are applied against mandrels in the interstices defined by intersecting planes formed by stacked tapes of epoxy resin-impregnated graphite fibers.

FIG. 42 is a simplified elevation view of the continuous-process apparatus of FIG. 40.

FIG. 43 is a diagrammatic summarization of the steps in the process of manufacturing a grid structure according to the present invention using the continuous-process apparatus of FIG. 40.

FIG. 44 is a perspective view, partially in phantom outline, of a proposed spacecraft on which grid structures according to the present invention would be utilized as illustrated.

BEST MODE OF CARRYING OUT THE INVENTION

A three-dimensional grid structure of eggcrate configuration made from a graphite-epoxy composite material in accordance with the present invention is illustrated in FIG. 1. The arid structure of FIG. 1 is fabricated by weaving a filament made of graphite fibers on a loom 10 according to a predetermined pattern as shown in FIG. 2. The loom 10 comprises a planar frame 11 upon which a plurality of vertically extending posts 12 are mounted to enclose a generally rectangular cylindrical volume. In the particular embodiment shown in FIG. 2, the frame 11 is of generally square configuration, and the volume enclosed by the posts 12 is a square cylindrical volume.

In FIG. 3, three successive iterations of a pattern in which the filament is woven around the posts 12 of the loom 10 are shown. The grid structure thereby formed on the loom 10 has a so-called "eggcrate" configuration in which mutually orthogonal planar grid sections intersect each other to define square cylindrical interstices. The mutually orthogonal planar grid sections of the grid structure formed on the loom 10 "intersect" each other in the sense that portions of the graphite filament forming any one planar grid section pass through the planar grid sections that are orthogonal thereto. It is a feature of the present invention that the "intersecting" grid sections forming the grid structure are constructed from a single graphite filament. In contrast with typical eggcrate-type grid structures of the prior art, grid sections of a grid structure according to the present invention are not cut to receive "intersecting" grid sections.

The pattern as indicated in FIG. 3 in which the graphite filament is woven around the posts 12 of the loom 10 results in a relatively simple weave in which those portions of the graphite filament extending in one direction form a first set of mutually parallel grid sections, and those portions of the graphite filament extending in a direction orthogonal to the first set of grid sections form a second set of mutually parallel grid sections. The weaving pattern results in square cylindrical interstices bounded by the intersecting first and second sets of grid sections.

In order to form a three-dimensional woven grid structure, a plurality of mandrels 13 are individually wound with graphite filaments as shown in FIG. 4. Each of the mandrels 13 is elongate about a longitudinal axis, and has a transverse cross section that is configured and dimensioned so as to enable the mandrel 13 with a graphite filament winding thereon to fit tightly into a corresponding one of the interstices formed by the intersecting grid sections. As an alternative to the procedure of winding a graphite filament around each mandrel 13, a tape comprising graphite fibers impregnated with epoxy resin (i.e., so-called "prepreg" tape) could be wrapped around each mandrel 13 as shown in FIG. 5. The mandrels 13 (whether filament-wound or tape-wrapped) are then inserted into the corresponding interstices formed by the intersecting grid sections.

As seen in FIG. 6, the mandrels 13 are inserted into the corresponding interstices of the grid structure formed on the loom 10 so that any two adjacent mandrels 13 on opposite sides of any particular planar grid section are oriented with 90-degree rotations relative to each other about their longitudinal axes. In this way, vertically extending graphite filaments (or "prepreg" graphite fibers) on the mandrels 13 are brought into contact with horizontally extending portions of the graphite filament wound around the posts 12 on the loom 10 to form the intersecting grid sections. After the mandrels 13 have been inserted into the interstices, the graphite filaments (and the "prepreg" graphite fibers, if tape-wrapped mandrels 13 are used) are then impregnated with a liquid epoxy resin.

For the grid structure formed on the loom 10 shown in FIG. 6, all the interstices are of square cylindrical configuration with substantially identical dimensions. Therefore, all the mandrels 13 are identically configured and dimensioned so as to be interchangeable with each other. The mandrels 13 (whether filament-wound or tape-wrapped) are inserted into the interstices so that longitudinally extending portions of the graphite filaments on filament-wound mandrels 13, or longitudinally extending graphite fibers on "prepreg" tape-wrapped mandrels 13, are oriented generally orthogonally with respect to the portions of the graphite filament comprising the grid sections formed on the loom 10.

A technique is schematically illustrated in FIG. 7 for applying liquid epoxy resin to the portions of the graphite filament comprising the grid sections formed on the loom 10, and to the graphite filaments (or "prepreg" graphite fibers) on the mandrels 13. Thus, liquid epoxy resin is shown being poured from a can 14 to saturate the graphite filaments. Clamping devices mounted on the frame 11 of the loom 10 are then used to compress the epoxy-saturated graphite filaments on the mandrels 13 and on the contacting portions of the graphite filament woven around the posts 12 on the loom 10 together.

Referring again to FIG. 2, two clamping devices are mounted on the frame 11 in order to apply compressional forces in two mutually orthogonal directions against the mandrels 13 in the interstices defined by the grid sections formed on the loom 10. Each clamping device comprises a fixed abutment member 15, a movable abutment member 16, and an anchoring member 17. The fixed abutment member 15 of each clamping device is secured (as by screws) to the frame 11 inside the cylindrical volume enclosed by the vertical posts 12, and extends horizontally parallel to a row of the posts 12 defining one side of the cylindrical volume. The movable abutment member 16 of the same clamping device is positioned inside the cylindrical volume adjacent a row of the posts 12 defining an opposite side of the same volume, so that the fixed abutment member 15 and the movable abutment member 16 face each other. The anchoring member 17 is secured (as by screws) to the frame 11 outside the cylindrical volume enclosed by the posts 12. Adjustment screws 18, which extend through the anchoring member 17 and between adjacent posts 12 into the movable abutment member 16, enable the movable abutment member 16 to be translated laterally over the surface of the frame 11 toward or away from the fixed abutment member 15. Two such clamping devices are mounted on the frame 11 at right angles to each other.

As shown in FIG. 6, the mandrels 13 (whether filament-wound or tape-wrapped), when inserted into the interstices defined by the grid sections formed on the loom 10, assume a checkerboard-like arrangement, which ensures that the vertically extending graphite filaments on the mandrels 13 come into contact with corresponding portions of the horizontally extending graphite filament woven around the posts 12. After the graphite filaments have been saturated with liquid epoxy resin as indicated in FIG. 7, a cover frame 19 is fitted over the posts 12 as shown in FIG. 8.

The cover frame 19 is configured like the frame 11 upon which the posts 12 are mounted, except that the cover frame 19 has recesses positioned and dimensioned to receive top ends of the posts 12 when the cover frame 19 is fitted over the posts 12. Two clamping devices are mounted on the cover frame 19 in substantially the same manner as the two previously mentioned clamping devices are mounted on the frame 11. Each clamping device on the cover frame 19 comprises a fixed abutment member 15', a movable abutment member 16' and an anchoring member 17' which are indicated in phantom view in FIG. 8. Adjustment screws 18', which extend through the anchoring member 17' and between adjacent posts 12 into the movable abutment member 16', so as to enable the movable abutment member 16' to be translated laterally over the surface (i.e., the undersurface in the perspective of FIG. 8) of the cover frame 19 toward or away from the fixed abutment member 15'. The cover frame 19 is fitted over the posts 12 so that the fixed abutment members 15' and the movable abutment members 16' of the two clamping devices mounted on the cover frame 19 are located inside the cylindrical volume enclosed by the posts 12, and so that the anchoring members 17' of the same two clamping devices are located outside the cylindrical volume adjacent corresponding edges of the cover frame 19.

When the cover frame 19 is in place over the posts 12, the adjustment screws 18 and 18' are tightened so as to apply compressional forces near the top and bottom ends, respectively, of the outermost mandrels 13 around the periphery of the checkerboard-like arrangement of the mandrels 13. A cross-sectional view of the loom 10 with the cover frame 19 in place, and with the clamping devices in operation, is shown in FIG. 9. After the adjustment screws 18 and 18' have been tightened to apply the compressional forces to the mandrels 13, the entire loom 10 with the cover frame 19 in place thereon is then inserted into an oven 20 in which the epoxy resin that has impregnated the graphite fibers is cured. Typically, the curing of a graphite-epoxy material requires that the oven 20 be maintained at a temperature of approximately 120° C. to 180° C. for one to two hours.

After the epoxy resin has been cured, the loom 10 is taken from the oven 20, and the cover frame 19 is removed. Then, the 14 graphite fibers in the vicinity of the posts 12 are cut by a conventional cutting technique to enable the grid structure to be lifted away from the frame 11. The grid structure now comprises a plurality of intersecting planar grid sections made of a composite graphite-epoxy material, where each grid section consists of two plys (i.e., a first ply and a second ply) that are inextricably fused together. The first ply consists of the vertically extending graphite filaments received from the mandrels 13, and the second ply consists of portions of the graphite filament that were woven horizontally around the posts 12 on the loom 10. Although the two plies are inextricably fused together as a result of the curing of the epoxy resin, it is instructive to illustrate the two plies as visually distinguishable from each other in FIG. 10.

A technique is illustrated in FIG. 11 for removing the mandrels 13 from the interstices of the grid structure. As shown in FIG. 11, a cut is made in the first ply at the top end of each mandrel 13 by a conventional cutting tool 21, so that the mandrel 13 can be lifted out of the interstice. It is convenient to provide holes 22 adjacent the ends of the mandrels 13 to facilitate lifting of the mandrels 13 out of the interstices by using an appropriate tool 23, as indicated in FIG. 11. In practice, removal of the mandrels 13 can be facilitated by making the cut in the filament-wound or tape-wrapped covering of graphite fibers on each mandrel 13 (preferably on a straight portion thereof near the top end of each mandrel 13 in the vicinity of the hole 22) before the mandrels 13 are inserted into the corresponding interstices of the grid structure. After the mandrels 13 have been removed, the portions of the first ply extending beyond the grid structure ace trimmed away by an appropriate cutting technique, such as by using a diamond wire saw 24 as illustrated in FIG. 12.

A large-scale grid structure of the type shown in FIG. 1 can be fabricated by bonding together a number of smaller-scale grid structures made according to the technique illustrated in FIGS. 2–12. Thus, as shown in FIG. 13, end portions of the planner grid sections of two smaller-scale grid structures that are to be joined together to form a larger-scale grid structure are cut so as to provide tabs on each of the planar grid sections. The two smaller-scale grid structures are then positioned so that the tabs on the end portions of the grid sections of one of the smaller-scale grid structures are interleaved with the tabs on the end portions of the grid sections of the other of the smaller-scale grid structures. A "prepreg" tape containing graphite fibers embedded in an uncured epoxy matrix is then positioned on one side of the interleaved tabs. The "prepreg" tape is then pressed against the tabs by a conventional clamping technique, and the epoxy resin is cured.

Three steps in the procedure for joining two smaller-scale grid structures to form a larger-scale grid structure are illustrated in FIG. 14. In the first step shown in FIG. 14 as step (A), tabs on the end portions of planar grid sections of one grid structure are positioned in interleaving contact with tabs on the end portions of mating planar grid sections of another grid structure. Then, in the second step shown in FIG. 14 as step (B), an epoxy resin-impregnated tape of graphite fibers is applied to the interleaved tabs so that the graphite fibers of the tape extend generally orthogonally with respect to the graphite fibers on the interleaved tabs. Finally, in the third step shown in FIG. 14 as step (C), the "prepreg" tape is clamped against the interleaved tabs by means of a conventional clamping device. A number of smaller-scale grid structures can be joined together according to the technique illustrated in FIG. 14 to form a large-scale grid structure of desired size and configuration. The large-scale grid structure thereby formed is then placed in an oven for curing of the epoxy resin on the tape. When curing of the epoxy resin has been completed, the large-scale grid structure is taken from the oven and the clamping devices are removed.

An alternative technique for fabricating a three-dimensional grid structure according to the present invention is indicated in FIG. 15 (and illustrated in more detail hereinafter in FIG. 40). According to this alternative technique, crisscrossing tapes or rovings consisting of epoxy resin-impregnated graphite fibers extend in two different (e.g., orthogonal) directions between corresponding pairs of reels, which are arrayed so that the tapes or rovings extending in each direction are "stacked" with respect to each other to form intersecting planes defining the interstices of the grid structure. Mandrels covered with tapes or rovings consisting of the same kind of epoxy resin-impregnated graphite fibers are then inserted into the interstices defined by the intersecting planes. Then, heat is applied to cure the epoxy resin. The use of tapes or rovings of epoxy resin-impregnated graphite fibers instead of graphite filaments eliminates the need to apply liquid epoxy resin.

Grid structures of various configurations can be fabricated using the technique of the present invention. The configuration of any particular grid structure depends upon the arrangement of the posts 12 on the frame 11 of the loom 10. FIGS. 16–20 illustrate various configurations for grid structures that can be fabricated using corresponding arrangements of the post 12. FIG. 16 is a sketch of a grid structure whose intersecting grid sections define interstices of square cylindrical configuration. FIG. 17 is a sketch of a grid structure whose intersecting grid sections define interstices of rhomboidally cylindrical configuration. FIG. 18 is a sketch of a grid structure whose intersecting grid sections define interstices of triangularly cylindrical configuration. However, the grid sections defining the interstices of a grid structure according to the present invention need not necessarily be planar. Thus, in FIG. 19, a grid structure having a single arcuate row of interstices is illustrated. FIG. 20 illustrates a grid structure whose interstices are arranged in arcuate rows and wedge-shaped columns, where each of the interstices is defined by two curved grid surfaces having coaxially cylindrical surfaces of different radii with respect to a cylindrical axis, and by two planar grid sections extending radially in different directions from the cylindrical axis.

In FIG. 21, a loom is illustrated that can be used to fabricate a three-dimensional grid structure with rhomboidally cylindrical interstices as shown in FIG. 17. In principle, the loom illustrated in FIG. 21 operates in substantially the same manner as the loom illustrated in FIG. 6. The arrangement of the vertical posts on the loom of FIG. 21 ensures that the interstices of the grid structure formed thereon are rhomboidally cylindrical, and the mandrels (whether filament-wound or tape-wrapped) inserted into the interstices are correspondingly of rhomboidally cylindrical configuration. A graphite filament is shown wound around the vertical posts of the loom illustrated in FIG. 21 to form the grid sections of a grid structure of the type sketched in FIG. 17.

In FIG. 22, a loom is illustrated that can be used to fabricate a three-dimensional grid structure with triangularly cylindrical interstices as shown in FIG. 18. In principle, the loom illustrated in FIG. 22 also operates in substantially the same manner as the loom illustrated in FIG. 6. The arrangement of the vertical posts on the loom of FIG. 22 ensures that the interstices of the grid structure formed thereon are triangularly cylindrical, and the mandrels (whether filament-wound or tape-wrapped) inserted into the interstices are correspondingly of triangularly cylindrical configuration. The path of a graphite filament being woven around the vertical parts on the loom of FIG. 22 to form the grid sections of a grid structure of the type sketched in FIG. 18 is illustrated in FIG. 23.

A loom that can be used to fabricate the arcuate three-dimensional grid structure shown in FIG. 19 is illustrated in FIG. 24. In principle, the loom of FIG. 24 operates in substantially the same manner as the loom of FIG. 6, except that certain specialized mechanical features are provided on the loom of FIG. 24 to accommodate the arcuate configuration of the grid structure. Thus, the loom of FIG. 24 comprises a planar frame 41 upon which an arcuate groove 42 is provided on a surface portion thereof. Four posts 43, 44, 45 and 46 extend vertically from the frame 41, so that the posts 43 and 44 are mounted on one side of the groove 42 and the posts 45 and 46 are mounted on the other side of the groove 42. The posts 43 and 45 are positioned collinearly along a first radius of the arcuate groove 42, and the posts 44 and 46 are positioned collinearly along a second radius of the arcuate groove 42. The posts 43 and 44 lie on a first arc concentric with (but of shorter radius than) the arcuate groove 42, and the posts 45 and 46 lie on a second arc concentric with (but of longer radius than) the arcuate groove 42.

A plurality of mandrels 47 are provided, which are configured and dimensioned to define the interstices of the grid structure. As shown in FIG. 25, each mandrel 47 has a planar top surface, a generally planar bottom surface with an arcuate tongue 48 projecting therefrom, two planar side surfaces, and two curved side surfaces. The planar top and bottom surfaces of each mandrel 47 are parallel to each other, and the tongue 48 projecting from the bottom surface is configured and dimensioned to be received in the arcuate groove 42 on the surface of the frame 41. The two planar side surfaces of each mandrel 47 lie on correspondingly different radii of the accurate groove 42 when the mandrel 47 is positioned so that the tongue 48 is received in the arcuate groove 47. The two curved side surfaces of each mandrel 47 are concentric with each other at correspondingly different radial distances along radii of the arcuate groove 42.

A cylindrical pin hole is provided on each of the curved side surfaces of each mandrel 47, and end blocks 49 and 50 are dimensioned and configured to cover corresponding side surfaces. Cylindrical coupling pins (shown in phantom outline in FIG. 25) project from the end blocks 49 and 50, and are configured and dimensioned to be received in corresponding pin holes on the curved side surfaces of the mandrel 47. The mandrels 47 are wound with graphite filaments (or wrapped with "prepreg" tape consisting of graphite fibers) as indicated in FIG. 25. The orientation of the graphite filaments on the mandrels 47 (whether filament-wound or tape-wrapped) is generally orthogonal with respect to the orientation of the portions of the graphite filament comprising the grid sections formed on the loom shown in FIG. 24.

The mandrels 47 are positioned adjacent each other in an arcuate arrangement along the groove 42 on the frame 41 between the vertical posts 43 and 45 at one end thereof and the vertical posts 44 and 46 at the other end thereof, as shown in FIG. 24. The end blocks 49 and 50 are positioned adjacent corresponding curved side surfaces of each of the mandrels 47, so that the coupling pins projecting from the end blocks 49 and 50 enter the pin holes on the corresponding curved side surfaces of the mandrel 47. The depth of the pin holes and the length of the coupling pins are predetermined so that the coupling pins cannot fully enter into the pin holes, but instead go only partway into the pin holes so as to maintain a gap between each of the end blocks 49 and 50 and the corresponding curved side surfaces of the mandrel 47 adjacent thereto. In order to form a grid structure having interstices of the required configuration, a graphite filament is then wound around the posts 43, 44, 45 and 46, the mandrels 47, and the end blocks 49 and 50 in a path as indicated in FIG. 26. As the graphite filament is woven in further successive paths as indicated in FIG. 26, a grid structure having the arcuate configuration sketched in FIG. 19 is formed.

After the weaving process on the loom of FIG. 24 has been completed, liquid epoxy resin is then applied so as to impregnate the graphite filaments on the mandrels 47 and the portions of the woven graphite filament comprising the grid sections formed on the loom. The resin-impregnated graphite filaments are then compressed by a clamping device as illustrated in FIG. 24, and the loom with the compressed resin-impregnated graphite filaments thereon is placed in an oven at an appropriate temperature for a suitable length of time to cure the epoxy resin.

The clamping device shown in FIG. 24 comprises a fixed abutment member 51 having an arcuate surface against which the end blocks 50 abut, a movable abutment member 52 having an arcuate surface that can be positioned to abut the end blocks 49, and an anchoring member 53. The fixed abutment member 51 is secured (as by screws) to the frame 41 at a position radially outward of the arcuate groove 42. The movable abutment member 52 is positioned on the frame 41 radially inward of the arcuate groove 42, and the anchoring member 53 is secured (as by screws) to the frame 41 at a position radially inward of the movable abutment member 52. An adjustment screw 54, which extends through the anchoring member 53 into the movable abutment member 52, enables the movable abutment member 52 to be translated radially inward and outward over the surface of the frame 41. As the adjustment screw 54 is tightened, the bottom portions of the end blocks 49 are pressed against the mandrels 47.

A cover frame 55 (which is analogous to the cover frame 19 shown in FIG. 8) is fitted over the posts 43, 44, 45 and 46, and over the mandrels 47 and the end blocks 49 and 50, after the graphite filaments have been saturated with liquid epoxy resin. The cover frame 55 comprises an outer wall portion 56 having an arcuate surface against which the end blocks 50 abut, and an inner wall portion 57 that is spaced apart from the end blocks 49. A movable abutment member 58 is positioned against an undersurface of the cover frame 55 in the space between the inner wall portion 57 and the end blocks 49, and is held in position by means of an adjustment screw 59 extending through the inner wall portion 57 of the cover frame 55 into the movable abutment member 58. The adjustment screw 59 enables the movable abutment member 58 to be translated radially inward and outward against the undersurface of the cover frame 55. As the adjustment screw 59 is tightened, the top portions of the end blocks 49 are pressed against the mandrels 47.

An anchoring member 60 is secured (as by screws) to the frame 41 so as to straddle the arcuate groove 42 in the vicinity of the posts 43 and 45 outside an arcuate region whose corners are defined by the posts 43, 44, 46 and 45. A movable abutment member 61 is positioned on the frame 41 so as to straddle the arcuate groove 42 in the space between the anchoring member 60 and the particular mandrel 47 that is positioned adjacent the posts 43 and 45. An adjustment screw 62 passes through the anchoring member 60 into the movable abutment member 61, and enables the movable abutment member 61 to be translated generally along the arcuate groove 42 toward or away from the mandrel 47 positioned adjacent the posts 43 and 45. The movable abutment member 61 is dimensioned to fit between the posts 43 and 45 so as to abut a bottom portion of the mandrel 47 adjacent thereto. Similarly, an anchoring member 63 is secured (as by screws) to the frame 41 so as to straddle the arcuate groove 42 in the vicinity of the posts 44 and 46 outside the arcuate region whose corners are defined by the posts 43, 44, 46 and 45. A movable abutment member 64 is positioned on the frame 41 so as to straddle the arcuate groove 42 in the space between the anchoring member 63 and the particular mandrel 47 that is positioned adjacent the posts 44 and 46. An adjustment screw 65 passes through the anchoring member 63 into the movable abutment member 64, and enables the movable abutment member 64 to be translated generally along the arcuate groove 42 toward or away from the mandrel 47 positioned adjacent the posts 44 and 46. The movable abutment member 64 is dimensioned to fit between the posts 44 and 46 so as to abut a bottom portion of the mandrel 47 adjacent thereto.

On the cover frame 55, a sidewall portion (not shown in FIG. 24) extends downward into the space between the posts 43 and 45, and a sidewall portion 66 extends downward into the space between the posts 44 and 46. As indicated in FIG. 24, an adjustment screw 67 passes through the sidewall portion 66 of the cover frame 55 into a movable abutment member (not visible in FIG. 24) positioned in the space between the sidewall portion 66 and the mandrel 47 adjacent the posts 44 and 46. The adjustment screw 67 enables the movable abutment member connected thereto to be translated toward or away from the mandrel 47 adjacent the posts 44 and 46. Similarly, although not shown in FIG. 24, an adjustment screw passing through the sidewall portion of the cover frame 55 that extends downward into the space between the posts 43 and 45 is connected to a movable abutment member that can thereby be translated toward or away from the mandrel 47 adjacent the posts 43 and 45. When the adjustment screw 67 is tightened, the movable abutment member connected thereto abuts a top portion of the mandrel 47 adjacent the posts 44 and 46; and when the adjustment screw passing through the sidewall portion at the other end of the cover frame 55 is tightened, the movable abutment member connected thereto abuts a top portion of the mandrel 47 adjacent the posts 43 and 45.

When the cover frame 55 is in place over the posts 43, 44, 45 and 46, and over the mandrels 47 and the end blocks 49 and 50; and after the adjustment screws 54 and 59 have been tightened so as to apply compressional forces near the bottom and top ends, respectively, of the end blocks 49; and after the adjustment screws 62 and 65 have been tightened so as to apply compressional forces to the bottom portions of the mandrels 47; and after the adjustment screw 67 and the corresponding adjustment screw at the other end of the cover frame 55 have been tightened so as to apply compressional forces to the top portions of the mandrels 47; the entire loom with the cover frame 55 in place thereon is then inserted into an oven for curing of the epoxy resin. After the epoxy resin has been cured, the loom is taken from the oven and the cover frame 55 is removed. The mandrels 47 and the end blocks 49 and 50 are then removed, and portions of the resulting graphite-epoxy composite structure that are extraneous to the desired shape of the arcuate grid structure as shown in FIG. 19 are trimmed away by conventional means such as a diamond wire saw as illustrated in FIG. 27. A completed arcuate grid structure as formed on the loom of FIG. 24 is shown in FIG. 28.

In FIG. 29, a loom is illustrated that can be used to fabricate a grid structure as sketched in FIG. 20. The loom of FIG. 29 serves the same general purpose as the looms of FIGS. 6 and 24, except that certain specialized mechanical features are provided on the loom of FIG. 29 in order to produce the required configuration of the grid structure in which the interstices are arranged in arcuate rows and wedge-shaped columns.

The loom of FIG. 29 comprises a planar frame 71 upon which an array of fixed posts 72 and an array of movable posts 73 are mounted. The fixed posts 72 are arranged with respect to each other so that a graphite filament can be woven by successive traversals of a path around the fixed posts 72 according to a pattern that produces generally wedge-shaped radially extending columns. The movable posts 73 are secured in arcuate slots 74 arranged in corresponding pairs on the frame 71 on opposite sides of the array of fixed posts 72. The movable posts 73 of each pair are movable in their corresponding arcuate slots 74 from initial positions, at which separate graphite filaments can be strung in straight lines between the movable posts 73 of corresponding pairs so as to extend transversely with respect to the filament woven around the fixed posts 72, to final positions at which the filaments strung between the corresponding pairs of movable posts 73 are bent along arcuate paths. In operation, after each successive transversal of the path around the fixed posts 72 by the filament that forms the wedge-shaped columns, separate filaments are strung between corresponding pairs of the movable posts 73. Opposite ends of each of the separate filaments can be secured to corresponding movable posts 73 by means of a clip 75, as shown in cross-sectional detail in FIG. 30.

After separate filaments have been strung between the corresponding pairs of movable posts 73, another traversal of the path around the fixed posts 72 is made by the filament that forms the wedge-shaped columns, after which another set of separate filaments is strung between the corresponding pairs of movable posts 73. This process is repeated until a three-dimensional grid structure is formed having a two-dimensional weave on each grid section thereof, where the interstices of the grid structure are arranged in rectilinear rows and wedge-shaped columns. Then, after the filaments comprising the grid structure are all in place on the loom, a first set of mandrels with longitudinally extending graphite filaments on the surfaces thereof is positioned in recesses provided therefor on the surface of the frame 71 between a first pair of the movable posts 73. These mandrels could be filament-wound in the manner illustrated in FIG. 2 or tape-wrapped in the manner illustrated in FIG. 3 to provide the longitudinally extending filaments on the surfaces thereof.

The mandrels (for which reference numbers are not provided in FIG. 29 so as to prevent excessive cluttering of the drawing) are configured so that, when the movable posts 73 of the first pair are moved to their final position, the graphite filaments strung between the movable posts 73 of the first pair are thereby bent to assume a desired arcuate configuration. Then, a second set of mandrels with longitudinally extending graphite filaments on the surfaces thereof is positioned in recesses provided therefor on the surface of the frame 21 between a second pair of the movable posts 73. The mandrels of the second set are configured to bear against the graphite filaments strung between the movable posts 73 of the first pair when bent into the desired arcuate configuration, and to bend the graphite filaments strung between the movable posts 73 of the second pair into an arcuate configuration that is concentric with respect to the arcuate configuration of the filaments strung between the first pair of movable posts 73 when the movable posts 73 of the second pair are moved to their final position. In like manner, additional sets of mandrels with longitudinally extending graphite filaments on the surfaces thereof are successively positioned in recesses provided therefor on the surface of the frame 71 after corresponding pairs of movable posts 73 are successively moved to their final positions in the slots 74.

The above-described procedure for forming a grid structure of the kind illustrated in FIG. 20 on a loom of the type shown in FIG. 29 is illustrated schematically in FIGS. 31A, 31B and 31C. Thus, in FIG. 31A, the filaments that are strung between corresponding pairs of the movable posts 73 transversely across the filament woven around the fixed posts 72 are shown as straight lines forming rectilinear rows of interstices. The first set of mandrels is shown in place in FIG. 31A, and the first pair of movable posts 73 is shown being moved to final positions 73' indicated by broken-line circles. Movement of the first pair of posts 73 to their final positions 73' causes the filaments strung between the first pair of movable posts 73 to assume an arcuate shape as indicated by a broken-line arc.

In FIG. 31B, the second set of mandrels is shown in place on the frame 71, and the second pair of movable posts 73 is shown being moved to final positions 73' at which the filaments strung between the second pair of movable posts 73 are caused to assume an arcuate shape (as indicated by a broken-line arc) that is concentric with respect to the arcuate shape of the filaments strung between the first pair of movable posts 73. In FIG. 31C, the third set of mandrels is shown in place on the frame 71, and the third pair of movable posts 73 is shown being moved to final positions 73' so that the filaments strung between the third pair of movable posts 73 are likewise caused to assume an arcuate shape. Additional sets of mandrels are positioned in succession on the frame 71, and the filaments strung between successively moved pairs of movable posts 73 are likewise caused to assume arcuate shapes, whereby a grid pattern is formed having arcuate rows and wedge-shaped columns.

With reference again to FIG. 29, liquid epoxy resin is applied to the graphite filaments forming the grid structure (viz., the filament woven around the fixed posts 72, the filaments strung between corresponding pairs of the movable posts 73, and the filaments wound or wrapped around the surfaces of the mandrels). Clamping devices mounted on the loom, as shown in FIG. 29, are then tightened to apply compressional forces to the mandrels, and a cover frame (not shown in FIG. 29) is then placed over the posts 72 and 73. The entire loom with the cover frame in place is then inserted into an oven for curing of the epoxy resin. After the epoxy resin has cured, the mandrels are removed from the interstices of the resulting graphite-epoxy composite structure, and the composite structure is removed from the loom. Portions of the composite that are extraneous to the desired shape of the grid structure as shown in FIG. 20 are then trimmed away.

It is possible to provide orientations other than mutually orthogonal orientations for the graphite filaments in the various grid sections of a grid structure according to the present invention. Thus, an exemplary eggcrate-type grid structure is illustrated in FIG. 32 in which the filament woven to form the grid sections defining the interstices of the grid structure extends in directions that are non-perpendicular to the elongate axes of the interstices into which the filament-wound (or tape-wrapped) mandrels are inserted. In FIG. 33, the grid sections defining the interstices of the grid structure are formed from a filament woven so as to criss-cross itself on each grid section in directions non-perpendicular to the elongate axes of the interstices.

In FIG. 34, an illustration is provided of a loom suitable for weaving a filament into a pattern as shown in FIG. 33. The loom is FIG. 34 comprises a generally planar annular frame 81 with a first set of posts 82 and a second set of posts 83 extending vertically in one direction (i.e., upward) therefrom, and a third set of posts 84 and a fourth set of posts 85 extending vertically in the opposite direction (i.e., downward) therefrom. The first and second sets of posts 82 and 83 are secured to the annular frame 81 around a first semicircular arc thereof, and the third and fourth sets of posts 85 and 86 are secured to the annular frame 81 around a second (i.e., the opposite) semicircular arc thereof. Protuberances extend from each of the posts of the sets 82, 83, 84 and 85 inwardly with respect to the annular frame 81 at a specified angle (e.g., 45 degrees) with respect to the plane of the annular frame 81.

One end of a graphite filament is secured by means of a clip 86 to the protuberance extending from a first post of the set 82, and is woven around the protuberance extending from a corresponding first post of the set 84, and is then woven successively around the protuberances extending from second posts of the sets 82 and 84, and then around the protuberances extending from third posts of the sets 82 and 84, until the filament is wound around the protuberances extending from the last posts of the sets 82 and 84, whereupon the other end of the filament is secured by means of a clip (not visible in the perspective of FIG. 34) to the protuberance extending from the last post of the set 84. Similarly, another graphite filament is woven around corresponding protuberances extending from the sets of posts 83 and 85. One end of this other graphite filament is secured by means of a clip 87 to the protuberance extending from a first post of the set 83, and the other end of this other graphite filament is secured by means of a clip (not visible in FIG. 34) to the protuberance extending from the last post of the set 85. The two graphite filaments repeatedly crisscross each other to form intersecting grid sections defining the interstices as illustrated in FIG. 33. Mandrels (either filament-wound or tape-wrapped) of the type generally illustrated in FIG. 6 are then inserted into corresponding interstices.

The depth of the interstices of a grid structure formed on the loom illustrated in FIG. 34 is determined by the amount of filamentary material wound onto the protuberances extending from the sets of posts 82, 83, 84 and 85 secured to the annular frame 81 (which is related to the length of the protuberances), and by the amount of filamentary material wound onto the mandrels (which is related to the length of the mandrels) inserted into the intersecting grid sections formed by the crisscrossing filaments to define the interstices. Grid structures having very deep interstices can be fabricated by stacking a desired number of annular frames 81 on a planar base frame 88 in an arrangement as illustrated in FIG. 35. The base frame 88 could be mounted on an elevator mechanism as indicated in FIG. 35 to facilitate assembly of stacked annular frames 81 on the base frame 88, and to facilitate weaving of the crisscrossing graphite filaments around the protuberances on the corresponding sets of posts 82, 83, 84 and 85 extending from the annular frames 81. As successive annular frames 81 are added to previously stacked annular frames 81, the base frame 88 can be lowered (as indicated by the arrows in FIG. 35) to accommodate the convenience of workers performing the stacking and weaving. Elongate mandrels 89 (either filament-wound or tape-wrapped) are then inserted into the corresponding interstices defined by the intersecting grid sections formed by the crisscrossing graphite filaments. The graphite filaments woven around protuberances extending from posts secured to the base frame 88 and from posts secured to the annular frames 81, as well as the graphite filaments wound or wrapped around the mandrels 89, are then saturated with epoxy resin.

In FIG. 36, clamping devices 90 and 91 are illustrated, which are used to apply compressional forces in two mutually orthogonal directions against the mandrels 89. Each of the clamping devices 90 is one of a set of four load-transferring appliances, which are mounted on the planar base frame 88 so as to apply compressional forces against bottom end portions of the mandrels 89 that are received in an aperture provided therefor in the base frame 88. In the particular embodiment illustrated in FIG. 36, each clamping device 90 comprises a bar that can be driven by means of a piston into contact with the bottom end portions of an outer row of the mandrels 89.

Each of the clamping devices 91 shown in FIG. 36 is one of a set of four load-transferring appliances positioned in generally coplanar disposition with respect to each other at an intermediate position along the length of the mandrels 89. In the particular embodiment illustrated in FIG. 36, each clamping device 91 comprises a set of parallel rods extending from a holding block. Each rod passes between a corresponding pair of intersecting grid sections formed by the crisscrossing graphite filaments so that a distal end thereof bears against a mid-length portion of a corresponding outer-row mandrel 89. For exceptionally long mandrels 89, there can be additional sets of clamping devices 91 (with four clamping devices 91 to each set) positioned at various, preferably regularly spaced, intervals along the length of the mandrels 89. A pair of retaining clamps 92 and 93 is provided adjacent top end portions of the mandrels 89 to apply compressional forces thereto in mutually orthogonal directions.

FIG. 37 shows a particular type of oven 94 that can be used for curing the epoxy resin that saturates the graphite filaments forming the grid sections defining the interstices of the grid structure as well as the graphite filaments on the mandrels 89. The oven 94 comprises a cylindrical wall that is dimensioned to be lowered in place around the stacked annular frames 81 on the base frame 88. Wheel-rotated shafts pass through the oven wall to drive the clamping devices 90 toward or away, as desired, from the bottom end portions of the mandrels 89. Similarly, wheel-rotated shafts pass through the oven wall to bear against the holding blocks to which the parallel rods of the clamping devices 91 are attached so as to drive the rods toward or away, as desired, from the mid-length portions of the mandrels 89. Access to the retaining clamps 92 and 93 is provided by a hinged lid 95 forming the top wall of the oven 94. The bottom wall of the oven 94 is formed by the base frame 88.

A transverse cross-sectional view at the top of the oven 94 is shown in FIG. 38 in which the retaining clamps 92 and 93 are illustrated. A transverse cross-sectional view at a mid-portion of the oven 94 is shown in FIG. 39 in which the clamping devices 91 are illustrated.

A continuous process apparatus is illustrated in FIG. 40 for fabricating a grid structure of eggcrate configuration from tapes of epoxy resin-impregnated graphite filaments. However, in the simplified illustration of FIG. 40, no means is shown for applying lateral compressional forces to the mandrels positioned in the interstices defined by the grid sections formed by the intersecting "prepreg" tapes of graphite filaments. In FIG. 41, a means for applying lateral compressional forces to the mandrels is illustrated.

A schematic depiction of the operation of the continuous-process apparatus of FIG. 40 is provided in FIG. 42. As diagrammatically summarized in FIG. 43, which can be viewed in conjunction with FIG. 42, the process of fabricating a grid structure according to the present invention using an apparatus of the type illustrated in FIGS. 40 and 41 comprises the successive steps of:

1) Loading reels of "prepreg" graphite tapes onto spindles arranged so that a specified number of spaced-apart tapes forming planar grid sections of the grid structure extend longitudinally between corresponding pairs of reels, where the number of tapes extending longitudinally between each pair of reels determines the depth of the interstices of the grid structure;

2) Loading other reels of "prepreg" graphite tapes onto other spindles arranged so that the same specified number of spaced-apart tapes can be extended laterally (as by means of a conventional shuttle device) between corresponding pairs of reels, where the laterally extending tapes are interleaved between the longitudinally extending tapes to form the intersecting grid sections defining the interstices of the grid structure:

3) Clipping the laterally extending tapes adjacent outside rows of the longitudinally extending tapes;

4) Wrapping elongate mandrels with "prepreg" graphite tapes that extend parallel to the direction of elongation of the mandrels;

5) Inserting the tape-wrapped mandrels into corresponding interstices of the grid structure;

6) Applying longitudinal compressive forces on the mandrels;

7) Applying lateral compressive forces on the mandrels;

8) Applying heat to cure the epoxy resin impregnating the graphite fibers on the "prepreg" tapes extending between corresponding pairs of reels and wrapped around the mandrels;

9) Removing heat when the epoxy resin has been cured;

10) Removing the longitudinal and lateral compressive forces on the mandrels;

11) Removing the mandrels from the interstices of the grid structure; and

12) Trimming away portions of the grid structure thereby formed that are extraneous to the desired final configuration for the grid structure.

Many different types of grid structures for use in various types of applications can be fabricated by techniques as described and illustrated herein. In FIG. 44, a proposed spacecraft is shown on which grid structures according to the present invention would be utilized: e.g., an optical bench 96, a mirror support structure 97, struts 98, see-through trusses 99, and sandwich-type panels 100.

Particular embodiments of grid structures fabricated according to the present invention have been described in the foregoing specification and accompanying drawing. However, grid structures according to the present invention having different configurations suitable for different applications would become apparent to practitioners skilled in the art upon perusal of the specification and drawing. Therefore, the description presented herein is merely illustrative of the invention, which is more generally defined by the following claims and their equivalents.

We claim:

1. A method of fabricating a grid structure of desired configuration from a composite material substantially consisting of filamentary material embedded in a matrix, said method comprising the steps of:

a) arranging filamentary material according to a predetermined pattern to define interstices for said grid structure;

b) covering each one of a plurality of mandrels individually with filamentary material consisting of fibrous filament, said mandrels conforming in cross-sectional configuration to said interstices defined by said pattern, said fibrous filaments being arranged on said mandrels so as to extend predominantly transversely with respect to said filamentary material arranged to define said interstices when said mandrels are inserted into said interstices;

c) inserting said mandrels covered with said fibrous filaments into corresponding interstices defined by said pattern;

d) causing said filamentary material arranged to define said interstices and said filamentary material covering said mandrels to be impregnated with a matrix material;

e) applying compressional forces to said filamentary material impregnated with said matrix material between adjacent mandrels, said compressional forces being substantially entirely perpendicular to said fibrous filaments of said filamentary material covering said mandrels when said mandrels have been inserted into said corresponding interstices;

f) curing said matrix material that has impregnated said filamentary material, thereby forming an integral structure made of said composite material consisting of said filamentary material embedded in said matrix; and g) removing said mandrels from said interstices.

2. The method of claim 1 wherein the step of arranging filamentary material according to said predetermined pattern comprises weaving a filament made of a fibrous material according to said pattern.

3. The method of claim 1 wherein the step of arranging filamentary material according to said predetermined pattern comprises interleaving filamentary material according to said pattern.

4. The method of claim 1 wherein the step of covering a plurality of mandrels with filamentary material consisting of fibrous filaments comprises winding said fibrous filaments onto said mandrels.

5. The method of claim 1 comprising the further step of trimming away portions of said integral structure that are extraneous to said desired configuration for said grid structure.

6. The method of claim 1 wherein the step of covering a plurality of mandrels with filamentary material consisting of fibrous filaments comprises wrapping a tape comprising said fibrous filaments impregnated with said matrix material around each of said mandrels.

7. The method of claim 2 wherein said fibrous material is a material selected from a group consisting substantially of graphite, aramide, fiberglass, ceramic material, metallic material, and thermoplastic material.

8. The method of claim 7 wherein said matrix material is a material selected from a group consisting substantially of thermosetting resins and thermoplastic materials.

9. The method of claim 8 wherein said thermosetting resins include epoxy, polyester, phenolic and polyimide.

* * * * *